(12) United States Patent
Park et al.

(10) Patent No.: US 11,854,294 B2
(45) Date of Patent: Dec. 26, 2023

(54) ELECTRONIC DEVICES

(71) Applicant: Samsung Electronics Co., Ltd., Suwon-si (KR)

(72) Inventors: Kyung Bae Park, Hwaseong-si (KR); Sung Han Kim, Seongnam-si (KR); Sung Young Yun, Suwon-si (KR); Seon-Jeong Lim, Yongin-si (KR); Chul Joon Heo, Busan (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 17/464,100

(22) Filed: Sep. 1, 2021

(65) Prior Publication Data

US 2022/0075981 A1 Mar. 10, 2022

(30) Foreign Application Priority Data

Sep. 4, 2020 (KR) .................. 10-2020-0113273

(51) Int. Cl.
*G06V 40/13* (2022.01)
(52) U.S. Cl.
CPC .................. *G06V 40/1318* (2022.01)
(58) Field of Classification Search
CPC ............................... G06V 40/12–1394
See application file for complete search history.

(56) References Cited

U.S. PATENT DOCUMENTS

| | | | | |
|---|---|---|---|---|
| 8,989,445 B2 * | 3/2015 | Pirim | .................. | G06T 7/70 |
| | | | | 382/128 |
| 9,600,708 B2 | 3/2017 | Kim et al. | | |
| 9,909,270 B1 * | 3/2018 | Bonifacio | .......... | G09F 15/0037 |
| 10,181,070 B2 | 1/2019 | Smith et al. | | |
| 10,283,578 B2 * | 5/2019 | Ka | .................. | G09G 3/3233 |
| 10,331,939 B2 * | 6/2019 | He | .................. | H10K 59/40 |
| 10,366,272 B2 * | 7/2019 | Song | .................. | G06V 40/1318 |
| 10,380,404 B2 * | 8/2019 | Kim | .................. | G06V 40/1335 |
| 10,496,868 B2 * | 12/2019 | Sun | .................. | H01L 27/146 |
| 10,643,051 B2 | 5/2020 | Lee et al. | | |
| 10,727,285 B2 * | 7/2020 | Chung | .................. | H10K 59/65 |
| 10,796,127 B2 * | 10/2020 | Park | .................. | H10K 59/65 |

(Continued)

FOREIGN PATENT DOCUMENTS

| | | |
|---|---|---|
| JP | 5780970 B2 | 9/2015 |
| KR | 10-1418760 B1 | 7/2014 |

(Continued)

OTHER PUBLICATIONS

Extended European Search Report dated Feb. 1, 2022 for corresponding European Application No. 21194685.0.

*Primary Examiner* — Patrick F Marinelli
(74) *Attorney, Agent, or Firm* — Harness, Dickey & Pierce, P.L.C.

(57) ABSTRACT

An electronic device includes a display panel and a biometric sensor. The display panel includes a light emitter. The biometric sensor is stacked with the display panel and is configured to detect light emitted from the display panel and reflected by a recognition target that is external to the electronic device. The biometric sensor includes a silicon substrate and a photoelectric conversion element on the silicon substrate. The photoelectric conversion element includes a photoelectric conversion layer having wavelength selectivity.

22 Claims, 12 Drawing Sheets

(56) References Cited

U.S. PATENT DOCUMENTS

| | | | |
|---|---|---|---|
| 10,845,904 B2 | 11/2020 | Kim et al. | |
| 10,861,891 B2* | 12/2020 | Kim | H01L 27/1464 |
| 10,891,461 B2* | 1/2021 | Liu | G06V 10/143 |
| 10,978,523 B2* | 4/2021 | Park | H10K 59/35 |
| 11,114,509 B2* | 9/2021 | Li | H10K 59/131 |
| 11,177,323 B2* | 11/2021 | Xiao | G06F 3/0412 |
| 11,239,286 B2* | 2/2022 | Park | H10K 50/828 |
| 11,289,533 B2* | 3/2022 | Lin | H01L 27/14621 |
| 2010/0177060 A1 | 7/2010 | Han | |
| 2017/0123542 A1* | 5/2017 | Xie | G06F 3/0421 |
| 2017/0228580 A1* | 8/2017 | Li | G09G 5/10 |
| 2017/0300736 A1* | 10/2017 | Song | G06V 40/1312 |
| 2017/0316244 A1 | 11/2017 | Yang | |
| 2018/0060641 A1* | 3/2018 | Kim | G06V 40/1324 |
| 2018/0101271 A1* | 4/2018 | Tsai | G06F 3/0412 |
| 2018/0158877 A1* | 6/2018 | Zeng | H10K 59/40 |
| 2018/0357462 A1 | 12/2018 | Mackey et al. | |
| 2019/0012508 A1* | 1/2019 | Sun | H01L 21/44 |
| 2019/0013368 A1* | 1/2019 | Chung | H10K 59/351 |
| 2019/0057242 A1* | 2/2019 | Guo | G06F 18/00 |
| 2019/0095674 A1* | 3/2019 | Ko | H01L 31/153 |
| 2019/0157337 A1* | 5/2019 | Lin | G06V 40/1318 |
| 2019/0197284 A1* | 6/2019 | Park | G06F 21/32 |
| 2019/0238767 A1* | 8/2019 | Satou | H01L 27/146 |
| 2019/0303641 A1* | 10/2019 | Ko | H01L 27/156 |
| 2019/0310724 A1* | 10/2019 | Yeke Yazdandoost | H10K 59/121 |
| 2020/0026898 A1 | 1/2020 | Fan et al. | |
| 2020/0083302 A1* | 3/2020 | Park | H10K 50/828 |
| 2020/0111851 A1* | 4/2020 | Park | H10K 39/32 |
| 2020/0274077 A1* | 8/2020 | Ujiie | H01L 31/10 |
| 2020/0312928 A1* | 10/2020 | Chung | H10K 59/40 |
| 2020/0321384 A1 | 10/2020 | Huang | |
| 2020/0388210 A1* | 12/2020 | Thielemans | G09G 3/32 |
| 2020/0403024 A1* | 12/2020 | Lin | G06F 18/00 |
| 2021/0019017 A1 | 1/2021 | Yeke Yazdandoost et al. | |
| 2021/0042489 A1* | 2/2021 | Mueller | H04N 25/42 |
| 2021/0042495 A1* | 2/2021 | Song | G06V 40/1312 |
| 2021/0066397 A1* | 3/2021 | Xiao | H10K 59/00 |
| 2021/0192169 A1 | 6/2021 | Huang | |
| 2021/0248344 A1* | 8/2021 | Wu | G06V 40/1318 |
| 2021/0257420 A1* | 8/2021 | Park | H10K 59/65 |
| 2021/0305320 A1* | 9/2021 | Lim | H10K 85/311 |
| 2021/0367760 A1* | 11/2021 | McGough | H04L 63/0435 |
| 2022/0075981 A1* | 3/2022 | Park | G06V 40/1318 |
| 2022/0261584 A1* | 8/2022 | Heo | G06V 40/1318 |

FOREIGN PATENT DOCUMENTS

| | | | |
|---|---|---|---|
| KR | 10-2017-0000103 A | | 1/2017 |
| KR | 10-2017-0049731 A | | 5/2017 |
| KR | 10-2017-0105272 A | | 9/2017 |
| KR | 10-2019-0004678 A | | 1/2019 |
| KR | 10-2019-0008066 A | | 1/2019 |
| KR | 10-2019-0079295 A | | 7/2019 |
| KR | 10-2020-0040196 A | | 4/2020 |
| WO | WO-2019/080729 A1 | | 5/2019 |
| WO | WO-2019/114737 A1 | | 6/2019 |
| WO | WO-2020-068242 A1 | | 4/2020 |

* cited by examiner

ELECTRONIC DEVICES

CROSS-REFERENCE TO RELATED APPLICATIONS

This application claims priority to and the benefit of, under 35 U.S.C. § 119, Korean Patent Application No. 10-2020-0113273 filed in the Korean Intellectual Property Office on Sep. 4, 2020, the entire contents of which are incorporated herein by reference.

BACKGROUND

1. Field

Electronic devices are disclosed.

2. Description of the Related Art

Recently, there are growing demands for electronic devices implementing a biometric recognition technology that authenticates a person by extracting specific biometric information or behavioral characteristic information of a person with an automated device, centering on a finance, a healthcare, and mobile devices including one or more of the electronic devices.

SUMMARY

Some example embodiments provide an electronic device capable of performing an effective biometric recognition function with a thin thickness.

According to some example embodiments, an electronic device may include a display panel including a light emitter, and a biometric sensor stacked with the display panel in a vertical direction extending perpendicular to an outer surface of the display panel and configured to detect light emitted from the display panel and reflected by a recognition target that is external to the electronic device, wherein the biometric sensor includes a silicon substrate and a photoelectric conversion element on a silicon substrate and including a photoelectric conversion layer having wavelength selectivity.

The biometric sensor may be a CMOS sensor.

The photoelectric conversion layer may be configured to selectively absorb light of one of at least a portion of a visible wavelength spectrum or at least a portion of an infrared wavelength spectrum.

The display panel may be configured to emit light of the visible wavelength spectrum, and the photoelectric conversion layer may be configured to selectively absorb light of the at least a portion of the visible wavelength spectrum and may not be configured to absorb light of the infrared wavelength spectrum.

The photoelectric conversion layer may be configured to selectively absorb light of a full wavelength spectrum of about 400 nm to about 700 nm and may not be configured to absorb light of a full wavelength spectrum of about 800 nm to about 20 µm.

The photoelectric conversion layer may be configured to selectively absorb light of one of a blue wavelength spectrum, a green wavelength spectrum, or a red wavelength spectrum.

The electronic device may further include an infrared light source configured to emit light in an infrared wavelength spectrum, and the photoelectric conversion layer may be configured to absorb light in the at least a portion of the infrared wavelength spectrum.

The photoelectric conversion element may further include a first electrode and a second electrode facing each other, and at least one of the first electrode or the second electrode may be a light-transmitting electrode.

The biometric sensor may not include any infrared cut-filter such that the electronic device does not comprise any infrared cut-filter.

The biometric sensor may not include any color filter such that the electronic device does not comprise any color filter.

The display panel may include a display area including the light emitter and configured to emit a light, and a non-display area excluding the display area, and the photoelectric conversion element may at least partially overlap the non-display area in the vertical direction.

The display area may include a sub-pixel array including a plurality of first sub-pixels configured to display light of a blue wavelength spectrum, a plurality of second sub-pixels configured to display light of a green wavelength spectrum, and a plurality of third sub-pixels configured to display light of a red wavelength spectrum, and the photoelectric conversion element may be at least partially between at least two sub-pixels of the sub-pixel array in a horizontal direction extending parallel to the sub-pixel array.

The light emitter may include an organic light emitting material, a quantum dot, perovskite, or any combination thereof.

The biometric sensor may have a thickness between about 50 nm and about 0.5 mm.

According to some example embodiments, an electronic device may include a biometric sensor in which a plurality of photoelectric conversion elements on a silicon substrate for driving CMOS are arranged, each photoelectric conversion element including a first electrode, a photoelectric conversion layer configured to absorb light in the visible wavelength spectrum and does not absorb light in the infrared wavelength spectrum, and a second electrode, and a display panel including a plurality of light emitting elements on a substrate, each light emitting element of the plurality of light emitting elements including a third electrode, a light emitting layer including a light emitter, and a fourth electrode.

The biometric sensor may be configured to detect light reflected by a recognition target using light emitted from the display panel as a light source, wherein the recognition target is external to the electronic device.

The display panel may be closer to an exterior of the electronic device than the biometric sensor.

The electronic device may further include a battery, and the biometric sensor may be between the display panel and the battery.

The light emitter may be selected from an organic light emitting material, a quantum dot, perovskite, or any combination thereof.

At least one photoelectric conversion element of the plurality of photoelectric conversion elements may at least partially overlap an area that is horizontally between at least two adjacent light emitting elements of the plurality of light emitting elements, the at least one photoelectric conversion element at least partially overlapping the area in a vertical direction.

According to some example embodiments, a biometric sensor for an electronic device may include a silicon substrate and a photoelectric conversion element on the silicon substrate in a vertical direction that extends perpendicular to an upper surface of the silicon substrate. The photoelectric conversion element may include a photoelectric conversion layer configured to selectively absorb at least a portion of a visible wavelength spectrum or an infrared wavelength spectrum. The silicon substrate may not include any photosensing device within a volume defined by outer surfaces of the silicon substrate. The photoelectric conversion element may have a thickness in the vertical direction that is between about 5 nm and about 1 μm.

The photoelectric conversion layer may have a thickness in the vertical direction that is between about 5 nm and about 500 nm.

The photoelectric conversion element may further include a lower electrode and an upper electrode facing each other, wherein the photoelectric conversion layer is between the lower electrode and the upper electrode, and wherein at least one of the lower electrode or the upper electrode is a light-transmitting electrode.

The photoelectric conversion element may further include a buffer layer. The buffer layer may be a hole transport layer, a hole injection layer, a hole extraction layer, an electron blocking layer, an electron transport layer, an electron injection layer, an electron extraction layer, a hole blocking layer, an optical auxiliary layer, or any combination thereof. The buffer layer may be between the lower electrode and the photoelectric conversion layer, or between the upper electrode and the photoelectric conversion layer.

The biometric sensor may include a plurality of the photoelectric conversion elements on the silicon substrate in the vertical direction. Each photoelectric conversion element of the plurality of photoelectric conversion elements may include separate, respective upper electrodes, lower electrodes, and photoelectric conversion layers.

At least two adjacent photoelectric conversion elements of the plurality of photoelectric conversion elements may have at least one of respective upper electrodes, respective lower electrodes, or respective photoelectric conversion layers that are separate portions of a single layer extending continuously between the at least two adjacent photoelectric conversion elements.

At least two adjacent photoelectric conversion elements of the plurality of photoelectric conversion elements may have at least one of respective upper electrodes, respective lower electrodes, or respective photoelectric conversion layers that are separate layers, at least partially overlapping in a horizontal direction extending in parallel to the upper surface of the silicon substrate, that have different material compositions and/or different thicknesses in the vertical direction.

Effective biometric recognition may be implemented with a thin thickness.

DETAILED DESCRIPTION

Figure 1:
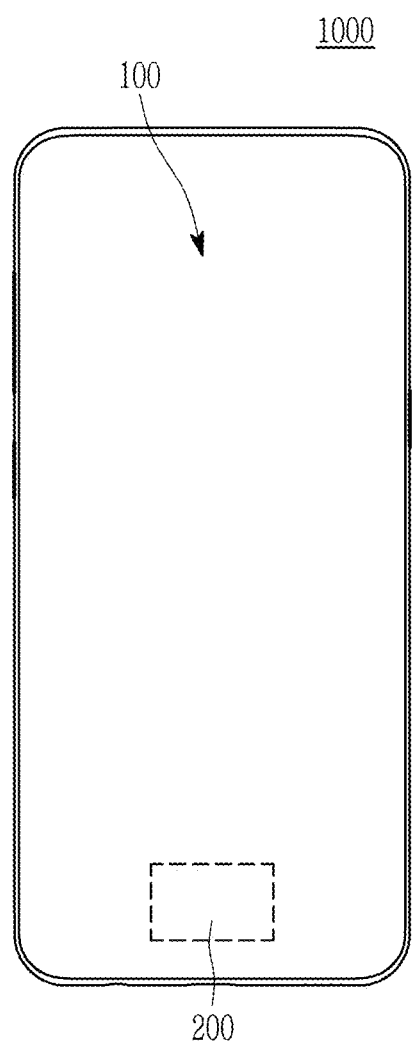
FIG. 1 is a schematic view illustrating an electronic device according to some example embodiments.

Hereinafter, some example embodiments are described in detail so that those of ordinary skill in the art can easily implement them. However, a structure that is actually applied may be implemented in various different forms, and the present inventive concepts are not limited to the example embodiments described herein.

In the drawings, the thickness of layers, films, panels, regions, etc., are exaggerated for clarity. It will be understood that when an element such as a layer, film, region, or substrate is referred to as being "on" another element, it may be directly on the other element or intervening elements may also be present. In contrast, when an element is referred to as being "directly on" another element, there are no intervening elements present.

Parts having no relationship with the description are omitted for clarity, and the same or similar constituent elements are indicated by the same reference numeral throughout the specification.

Hereinafter, the terms "lower" and "upper" are used for better understanding and ease of description, but do not limit the position relationship.

It will be understood that when an element such as a layer, film, region, or substrate is referred to as being "on" another element, it may be directly on the other element or intervening elements may also be present (e.g., the element may be isolated from direct contact with the other element). In contrast, when an element is referred to as being "directly on" another element, there are no intervening elements present. It will be understood that when an element such as a layer, film, region, or substrate is referred to as being "on" another element, it may be above or under the other element.

It will be understood that elements and/or properties thereof (e.g., structures, surfaces, directions, or the like), which may be referred to as being "perpendicular," "parallel," "coplanar," or the like with regard to other elements and/or properties thereof (e.g., structures, surfaces, directions, or the like) may be "perpendicular," "parallel," "coplanar," or the like or may be "substantially perpendicular," "substantially parallel," "substantially coplanar," respectively, with regard to the other elements and/or properties thereof.

Elements and/or properties thereof (e.g., structures, surfaces, directions, or the like) that are "substantially perpendicular" with regard to other elements and/or properties thereof will be understood to be "perpendicular" with regard to the other elements and/or properties thereof within manufacturing tolerances and/or material tolerances and/or have a deviation in magnitude and/or angle from "perpendicular," or the like with regard to the other elements and/or properties thereof that is equal to or less than 10% (e.g., a. tolerance of ±10%)).

Elements and/or properties thereof (e.g., structures, surfaces, directions, or the like) that are "substantially parallel" with regard to other elements and/or properties thereof will be understood to be "parallel" with regard to the other elements and/or properties thereof within manufacturing tolerances and/or material tolerances and/or have a deviation in magnitude and/or angle from "parallel," or the like with regard to the other elements and/or properties thereof that is equal to or less than 10% (e.g., a. tolerance of ±10%)).

Elements and/or properties thereof (e.g., structures, surfaces, directions, or the like) that are "substantially coplanar" with regard to other elements and/or properties thereof will be understood to be "coplanar" with regard to the other elements and/or properties thereof within manufacturing tolerances and/or material tolerances and/or have a deviation in magnitude and/or angle from "coplanar," or the like with regard to the other elements and/or properties thereof that is equal to or less than 10% (e.g., a. tolerance of ±10%)).

It will be understood that elements and/or properties thereof may be recited herein as being "the same" or "equal" as other elements, and it will be further understood that elements and/or properties thereof recited herein as being "the same" as or "equal" to other elements may be "the same" as or "equal" to or "substantially the same" as or "substantially equal" to the other elements and/or properties thereof. Elements and/or properties thereof that are "substantially the same" as or "substantially equal" to other elements and/or properties thereof will be understood to include elements and/or properties thereof that are the same as or equal to the other elements and/or properties thereof within manufacturing tolerances and/or material tolerances. Elements and/or properties thereof that are the same or substantially the same as other elements and/or properties thereof may be structurally the same or substantially the same, functionally the same or substantially the same, and/or compositionally the same or substantially the same.

It will be understood that elements and/or properties thereof described herein as being the "substantially" the same encompasses elements and/or properties thereof that have a relative difference in magnitude that is equal to or less than 10%. Further, regardless of whether elements and/or properties thereof are modified as "substantially," it will be understood that these elements and/or properties thereof should be construed as including a manufacturing or operational tolerance (e.g., ±10%) around the stated elements and/or properties thereof.

When the terms "about" or "substantially" are used in this specification in connection with a numerical value, it is intended that the associated numerical value include a tolerance of ±10% around the stated numerical value. When ranges are specified, the range includes all values therebetween such as increments of 0.1%.

Hereinafter, an electronic device according to some example embodiments will be described.

The electronic device according to some example embodiments is not particularly limited as long as it is an electronic device that requires a display function and a biometric function, for example, a smartphone, a mobile phone, a tablet PC, a laptop PC, a desktop PC, an e-book, a navigation device, a TV, a PDA (personal digital assistant), PMP (portable multimedia player), EDA (enterprise digital assistant), a wearable computer, Internet of Things (IoT), Internet of Everythings (IoE), a drone, a digital camera, a door lock, a safe, an automatic teller machine (ATM), a security device, a medical device, or an automotive electronic component, but is not limited thereto.

An electronic device according to some example embodiments is described with reference to the drawings.

Figure 2:
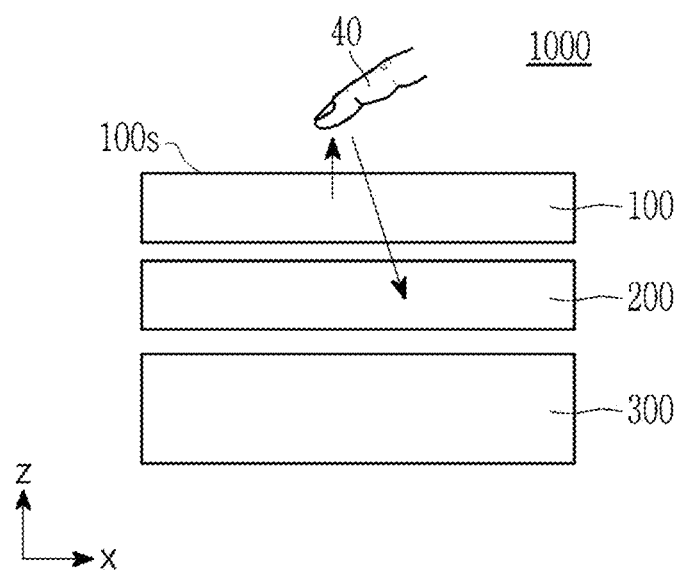
FIG. 2 is a cross-sectional view illustrating the electronic device of FIG. 1, according to some example embodiments.
Figure 3:
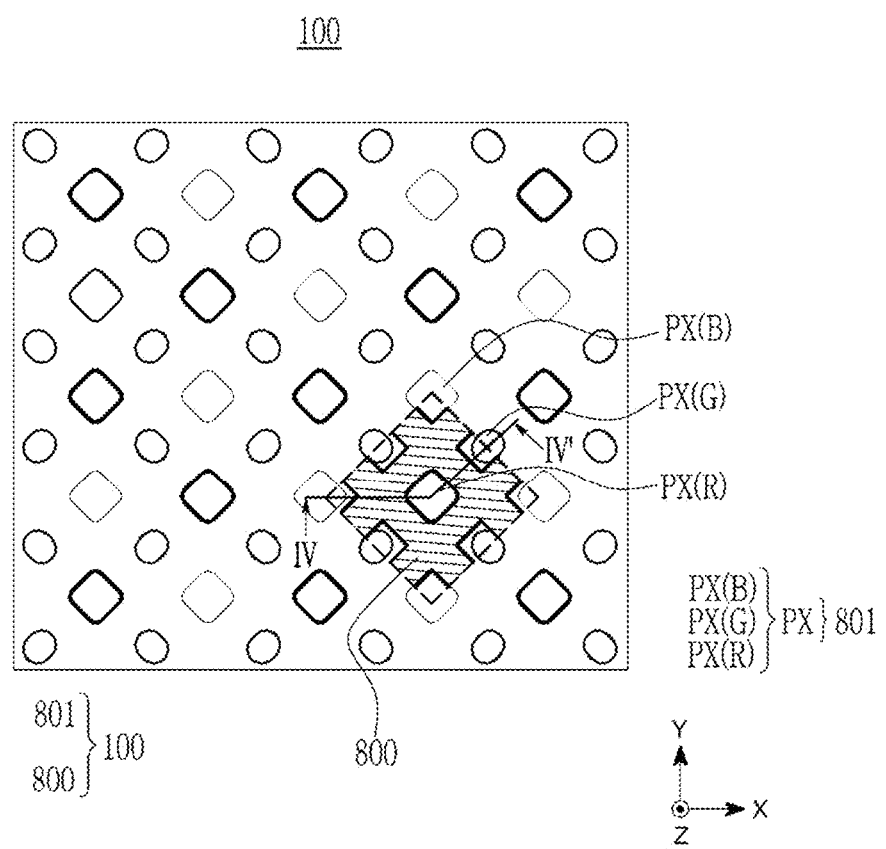
FIG. 3 is a plan view illustrating a display panel in the electronic device of FIGS. 1 and 2, according to some example embodiments.
Figure 4:
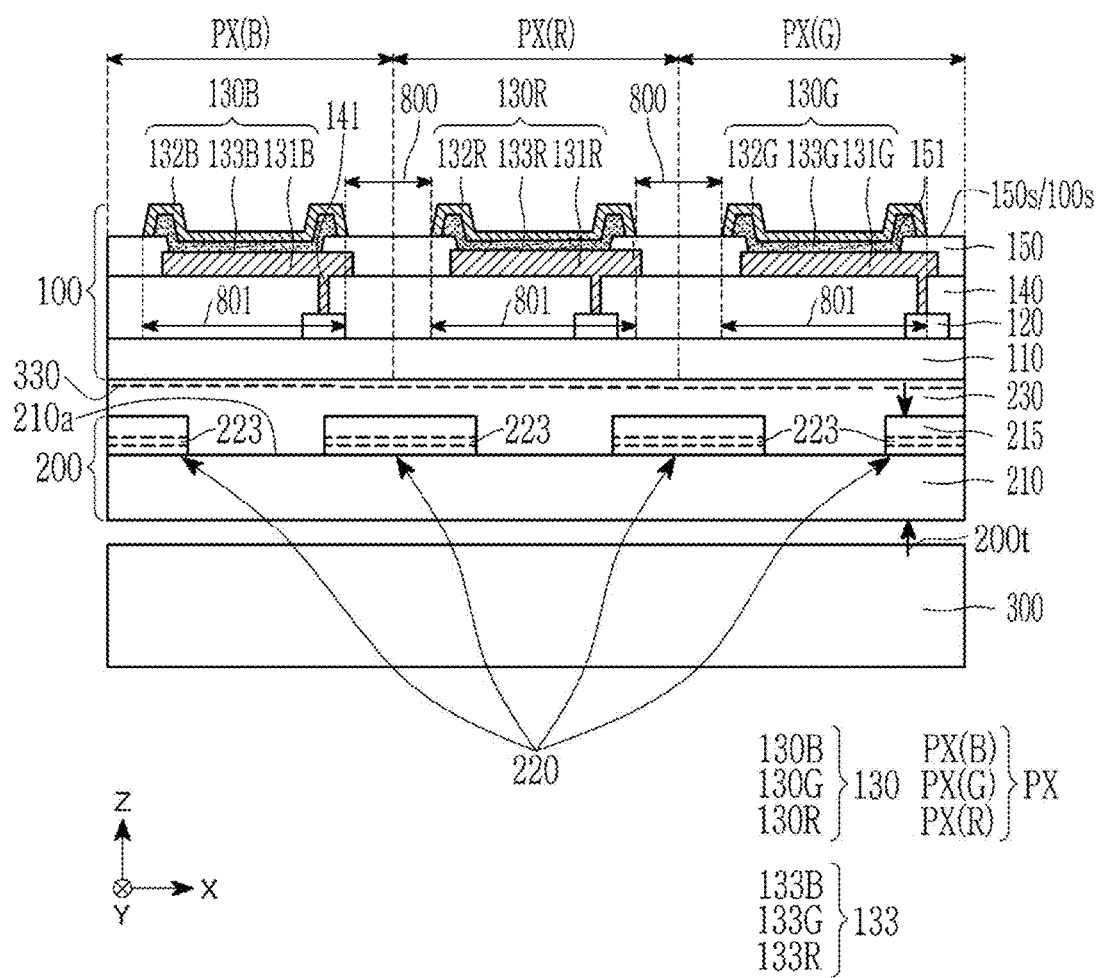
FIG. 4 is a cross-sectional view illustrating the electronic device of FIGS. 1 and 2, according to some example embodiments.
Figure 5:
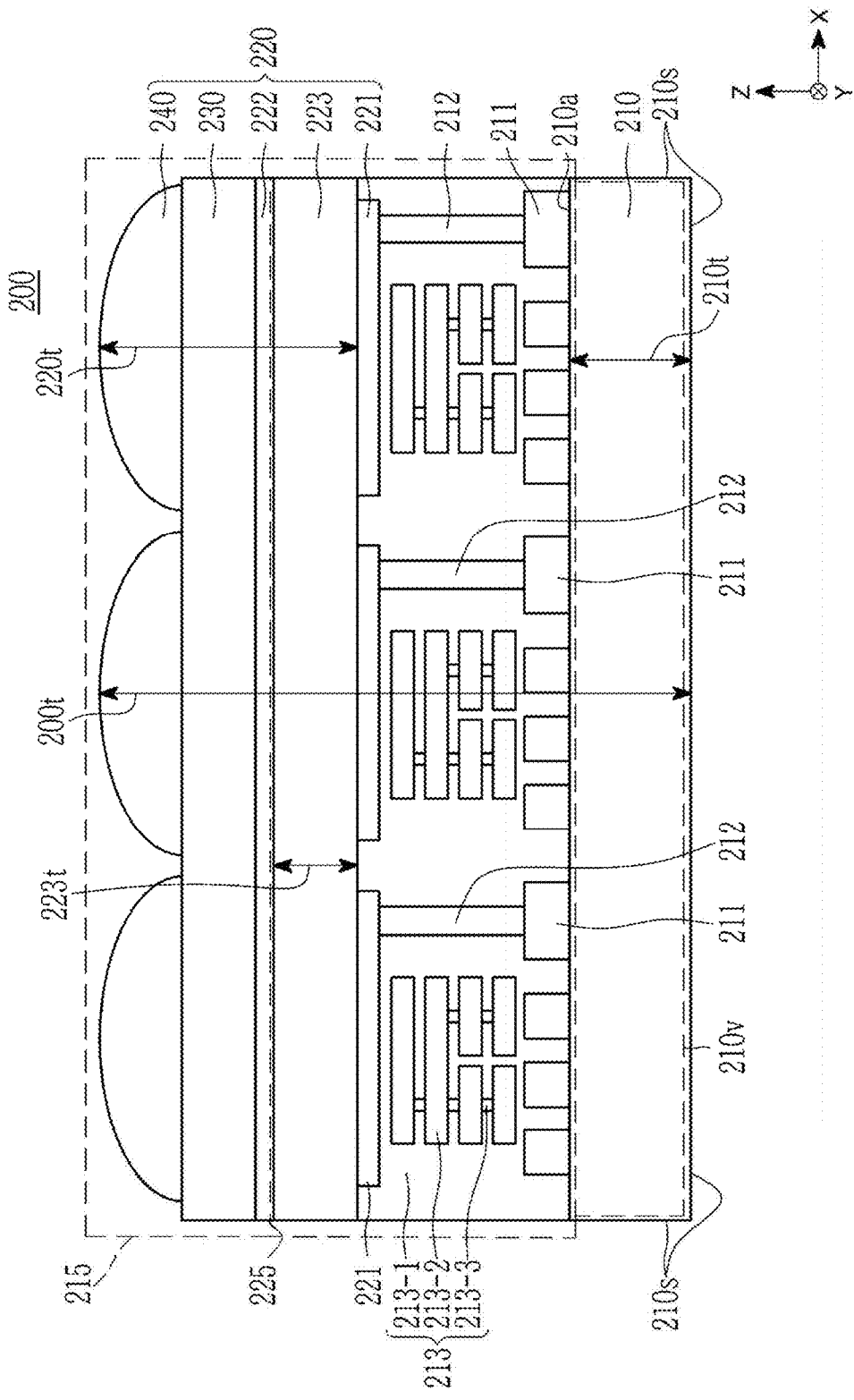
FIG. 5 is a cross-sectional view showing a photoelectric conversion element in the electronic device of FIG. 4, according to some example embodiments.

FIG. 1 is a schematic view illustrating an example of an electronic device according to some example embodiments, FIG. 2 is a cross-sectional view illustrating an example of the electronic device of FIG. 1, FIG. 3 is a plan view illustrating an example of a display panel in the electronic device of FIGS. 1 and 2, FIG. 4 is a cross-sectional view illustrating an example of the electronic device of FIGS. 1 and 2, and FIG. 5 is a cross-sectional view showing an example of a photoelectric conversion element in the electronic device of FIG. 4.

Referring to FIGS. 1 and 2, the electronic device 1000 according to some example embodiments includes a display panel 100 configured to display an image, a biometric sensor 200 disposed to be overlapped with at least a portion of the display panel 100 (e.g., overlapped in a direction extending perpendicular to an outer surface 100s of the display panel 100 that is configured to be proximate to an exterior of the electronic device 1000), and optionally a battery 300.

As shown in at least FIG. 2, display panel 100 and the biometric sensor 200 may be stacked with each other in the direction extending perpendicular to the outer surface 100s of the display panel 100 that is configured to be proximate to an exterior of the electronic device 1000. Such a direction, as shown in FIG. 2, may be a Z direction and may be referred to herein as a "vertical direction," and a direction extending parallel to the outer surface 100s may be an X direction and may be referred to herein as a "horizontal direction." For example, the display panel 100 may be disposed closer to a recognition target 40, based on the display panel 100 being closer to the exterior of the electronic device 1000 than the biometric sensor 200, such as a living body or a tool than the biometric sensor 200. The living body may be, for example, a finger, a fingerprint, a palm, an iris, a face, and/or a wrist, but is not limited thereto. That is, based on the recognition target 40, the electronic device 1000 may include a display panel 100 capable of contacting the recognition target 40, a biometric sensor 200 under the display panel 100, and optionally, a battery 300. As shown in FIG. 2, where an electronic device 1000 includes the battery 300, the biometric sensor 200 may be between the display panel 100 and the battery 300 (e.g., in the Z direction). The biometric sensor 200 may be configured to detect light that is emitted from the display panel 100 and then reflected by the recognition target 40 that is external to the electronic device 1000.

Referring to FIG. 3, the display panel 100 includes a plurality of sub-pixels (PX), also referred to herein as a sub-pixel array, displaying (e.g., configured to display) different colors (e.g., light of different wavelength spectra of the visible wavelength spectrum). The plurality of sub-pixels (PX) may display at least three primary colors, for example, a blue sub-pixel (PX (B)) displaying blue, a green sub-pixel (PX (G)) displaying green, and a red sub-pixel (PX (R)) displaying red. However, the present inventive concepts are not limited thereto, and an auxiliary sub-pixel (not shown) such as a white sub-pixel may be further included. A plurality of sub-pixels (PX) including a blue sub-pixel (PX (B)), a green sub-pixel (PX (G)), and a red sub-pixel (PX (R)) constitute a unit pixel to be arranged repeatedly along a row and/or column. In the drawings, as an example, an arrangement of a Pentile type is shown, but the arrangement of the sub-pixels (PX) is not limited thereto. An area occupied by the plurality of sub-pixels (PX) (e.g., sub-pixel array) and displaying colors by the plurality of sub-pixels (PX) may be a display area 801 displaying (e.g., configured to display) an image.

As shown in FIGS. 3 and 4, it will be understood that a sub-pixel (PX) may include a portion of the display panel 100 that includes a separate light emitting element 130 and a portion of the display panel 100 (e.g., portions of the substrate 110, thin film transistor 120, insulating layer 140, and pixel defining layer 150) that overlaps the separate light emitting element 130 in the vertical direction that extends perpendicular to the outer surface 100s (which may be at least partially defined by and/or may be understood to be the outer surface 150s of pixel defining layer 150). As noted above and as shown in FIGS. 3-4, such a vertical direction may be the Z direction. As shown in at least FIG. 4, in some example embodiments, a given sub-pixel (PX) may further include a portion of the display panel 100 that is adjacent to the separate light emitting element 130 in a horizontal direction that extends parallel to the outer surface 100s of the display panel 100 (e.g., X direction and/or Y direction which extend in parallel to at least the outer surface 150s) and may encompass a portion of a non-display area 800 extending between adjacent light emitting elements 130 of adjacent sub-pixels (PX). As further shown in FIG. 4, in some example embodiments, a horizontal boundary of a sub-pixel (PX) may be located between (e.g., equidistantly between) the light emitting element 130 of the given sub-pixel (PX) and a separate light emitting element 130 of an adjacent sub-pixel (PX) and may thus include a portion of layers 110, 120, 140, and 150 located within the non-display area 800 between light emitting elements 130 of separate sub-pixels (PX).

In some example embodiments, a given sub-pixel (PX) may be understood to be defined by a given light emitting element 130 of the display panel 100, such that at least a portion of layers 110, 140, 120, and 150 (e.g., portions thereof located in the non-display area 800) may be considered to be portions of the display panel 100 that are external to the sub-pixels (PX) of the display panel 100. In some example embodiments, the sub-pixels (PX) are limited to the light emitting elements 130, such that the remaining portions of the display panel 100 external to the light emitting elements 130 (e.g., layers 110, 120, 140, and 150) are considered to be external to the sub-pixels (PX).

In some example embodiments, and as shown in at least FIGS. 3 and 4, the display area 801 of the display panel 100 may be defined by the horizontal (e.g., X direction and Y direction) boundaries of the light emitting elements 130 that are configured to emit (e.g., display) light (e.g., display one or more colors), and portions of the display panel 100 that exclude the display area 801, and which are not configured to emit light by virtue of not including the light emitting elements 130 and being external to the horizontal boundaries of the light emitting elements 130, may be referred to as a non-display area 800. Thus, as shown in at least FIGS. 3-4, the display panel 100 will be understood to include a display area 801, that includes the one or more light emitting elements 130 of the display panel 100 and which is configured to display light, and a non-display area 800 that excludes the display area 801.

For example, a blue sub-pixel (PX (B)), a green sub-pixel (PX (G)), and a red sub-pixel (PX (R)) may each include a light emitter, also referred to herein interchangeably as a light emitting element 130. For example, the blue sub-pixel (PX (B)) may include a blue light emitter (e.g., blue light emitting element 130B) configured to emit light of a blue wavelength spectrum (hereinafter referred to as "blue light"), the green sub-pixel (PX (G)) may include a green light emitter (e.g., green light emitting element 130G) configured to emit light of the green wavelength spectrum (hereinafter referred to as "green light"), and the red sub-pixel (PX (R)) may include a red light emitter (e.g., red light emitting element 130R) configured to emit light of a red wavelength spectrum (hereinafter, referred to as "red light").

Accordingly, as shown in at least FIGS. 3 and 4, the display panel 100 may include a display area 801 that includes (e.g., is at least partially defined by a sub-pixel array of sub-pixels (PX) (e.g., plurality of sub-pixels (PX)), the sub-pixel array including a plurality of first sub-pixels configured to display light of a blue wavelength spectrum (e.g., blue sub-pixels (PX(B))), a plurality of second sub-pixels configured to display light of a green wavelength spectrum (e.g., green sub-pixels (PX(G))), and a plurality of third sub-pixels configured to display light of a red wavelength spectrum (e.g., red sub-pixels (PX(R))).

Herein, light "in" a wavelength spectrum may be interchangeably referred to as light "of" the wavelength spectrum. Herein, the blue wavelength spectrum may be greater than or equal to about 380 nm and less than about 500 nm, the green wavelength spectrum may be about 500 nm to about 600 nm, and the red wavelength spectrum may be greater than about 600 nm and less than or equal to about 700 nm. The emission spectrum of the blue light emitter may have, for example, a maximum emission wavelength ($\lambda_{max,e}$) in greater than or equal to about 380 nm and less than about 500 nm, the emission spectrum of the green light emitter may have, for example, a maximum emission wavelength ($\lambda_{max,e}$) in about 500 nm to about 600 nm, and the emission spectrum of the red light emitter may have, for example, a maximum emission wavelength ($\lambda_{max,e}$) in greater than about 600 nm and less than or equal to about 700 nm.

Therefore, the blue sub-pixel (PX (B)) may display blue by the light emitted from the blue light emitter, the green sub-pixel (PX (G)) may display green by the light emitted from the green light emitter, and the red sub-pixel (PX (R)) may display red color by light emitted from the red light emitter. Accordingly, it will be understood that the display panel 100 may include at least one light emitter, for example any or all of the blue light emitter of the blue light emitting layer 133B, the green light emitter of the green light emitting layer 133G, and/or the red light emitter of the red light emitting layer 133R. Each light emitter of the display panel 100 may include an organic light emitting material, a quantum dot, perovskite, or any combination thereof, as described later. Each light emitting element 130 may be a light emitting diode (LED) or an organic light emitting diode (OLED).

The display panel 100 further includes a non-display area 800 in addition to an area occupied by the plurality of sub-pixels (PX), that is, a display area 801. The non-display area 800 is an area other than the display area, for example, an area between at least two selected from a blue sub-pixel (PX (B)), a green sub-pixel (PX (G)), and a red sub-pixel (PX (R)).

Referring to FIG. 4, the display panel 100 includes a substrate 110, a thin film transistor 120 formed on the substrate 110, a light emitting element 130, an insulating layer 140, and a pixel defining layer 150.

The substrate 110 may be a light-transmitting substrate, for example, a glass substrate or a polymer substrate. The polymer substrate may include, for example, polycarbonate, polymethyl methacrylate, polyethylene terephthalate, polyethylene naphthalate, polyimide, polyamide, polyamideimide, polyethersulfone, polyorganosiloxane, styrene-ethylene-butylene-styrene, polyurethane, polyacrylic, polyolefin, or any combination thereof, but is not limited thereto.

A plurality of thin film transistors 120 are formed on the substrate 110. One or more thin film transistors 120 may be included for each sub-pixel (PX), for example, at least one switching thin film transistor and/or at least one driving thin film transistor for each sub-pixel (PX). The substrate 110 on which the thin film transistor 120 is formed may be referred to as a thin film transistor substrate (TFT substrate) or a thin film transistor backplane (TFT backplane).

The light emitting element 130 may be disposed for each sub-pixel (PX), and may be independently driven for each sub-pixel (PX). The light emitting element 130 may be, for example, a light emitting diode, an organic light emitting diode including an organic light emitting material, an inorganic light emitting diode including an inorganic light emitting material, an organic-inorganic light emitting diode including an organic-inorganic light emitting material, or a micro light emitting diode in which light emitters in a micro unit are arranged.

The light emitting element 130 includes a blue light emitting element 130B in a blue sub-pixel (PX (B)), a green light emitting element 130G in a green sub-pixel (PX (G)), and a red light emitting element 130R in a red sub-pixel (PX (R)).

The blue light emitting element 130B may include a lower electrode 131B, an upper electrode 132B, and a blue light emitting layer 133B, and the green light emitting element 130G may include a lower electrode 131G, an upper electrode 132G, and a green light emitting layer 133G, and the red light emitting element 130R may include a lower electrode 131R, an upper electrode 132R, and a red light emitting layer 133R.

One of the lower electrodes 131B, 131G, and/or 131R and/or the upper electrodes 132B, 132G, and/or 132R may be an anode, and the other may be a cathode. One of the lower electrodes 131B, 131G, and/or 131R and/or the upper electrodes 132B, 132G, and/or 132R may be a pixel electrode and the other may be a common electrode. For example, each of the lower electrodes 131B, 131G, and 131R may be the pixel electrode and the upper electrodes 132B, 132G, and 132R may be the common electrode. The lower electrodes 131B, 131G, and 131R and the upper electrodes 132B, 132G, and 132R may each independently be a light-transmitting electrode or a reflective electrode and at least one of the lower electrodes 131B, 131G, and/or 131R and/or the upper electrodes 132B, 132G, and 132R may be a light-transmitting electrode. For example, the upper electrodes 132B, 132G, and 132R may each be a light-transmitting electrode. The light-transmitting electrode may have a light transmittance of greater than or equal to about 80%, greater than or equal to about 85%, greater than or equal to about 90%, or greater than or equal to about 95%, and may include, for example, at least one of an oxide conductor, a carbon conductor, or a metal thin film. The oxide conductor may include, for example, one or more selected from indium tin oxide (ITO), indium zinc oxide (IZO), zinc tin oxide (ZTO), aluminum tin oxide (ATO), and aluminum zinc oxide (AZO), the carbon conductor may be one or more selected from graphene and carbon nanomaterials, and the metal thin film may be a thin film including aluminum (Al), magnesium (Mg), silver (Ag), gold (Au), an alloy thereof, or any combination thereof. The reflective electrode may include a reflective conductor such as aluminum (Al), silver (Ag), gold (Au), or an alloy thereof.

The blue light emitting layer 133B may be configured to emit blue light, the green light emitting layer 133G may be configured to emit green light, and the red light emitting layer 133R may be configured to emit red light. For example, the blue light emitting layer 133B, the green light emitting layer 133G, and the red light emitting layer 133R may each include an organic light emitting material configured to emit blue light, green light, and red light. For example, at least one host material and a fluorescent or phosphorescent dopant may be included in the blue light emitting layer 133B, the green light emitting layer 133G, and the red light emitting layer 133R.

It will be understood that each light emitting element 130 of the plurality of light emitting elements 130 may include a lower electrode (e.g., 131B, 131G, 131R), also referred to herein as a "third electrode," a light emitting layer (e.g., 133B, 133G, 133R) including a light emitter, and an upper electrode (e.g., 132B, 132G, 132R), also referred to herein as a "fourth electrode."

At least one charge auxiliary layer (not shown) may be further included between the lower electrode 131B and the blue light emitting layer 133B and/or between the upper electrode 132B and the blue light emitting layer 133B. At least one charge auxiliary layer (not shown) may be further included between the lower electrode 131G and the green light emitting layer 133G and/or between the upper electrode 132G and the green light emitting layer 133G. At least one charge auxiliary layer (not shown) may be further included between the lower electrode 131R and the red light emitting layer 133R and/or between the upper electrode 132R and the red light emitting layer 133R.

As shown, the display panel 100 may include a plurality of light emitting elements 130 on the substrate 110. The plurality of blue light emitting elements 130B, the plurality of green light emitting elements 130G, and the plurality of red light emitting elements 130R are alternately arranged along the in-plane direction (e.g., XY direction) of the substrate 110.

The insulating layer 140 may be formed on the whole surface of the substrate 110, and may be between the substrate 110 and the light emitting element 130. The insulating layer 140 may have a contact hole 141 for electrically connecting the lower electrodes 131B, 131G, and 131R of the light emitting element 130 and the thin film transistor 120.

The pixel defining layer 150 may also be formed on the whole surface of the substrate 110, and may be between adjacent sub-pixels (PX) to partition each sub-pixel (PX). The pixel defining layer 150 may have a plurality of openings 151 in each sub-pixel (PX), and the light emitting element 130 is in the opening 151.

The display panel 100 may further include an encapsulation layer or an encapsulation plate (not shown) covering the light emitting element 130. The encapsulation layer or the encapsulation plate may include a glass substrate, a polymer substrate, a metal thin film, and/or an insulating thin film, but is not limited thereto. An encapsulation layer or encapsulation plate may be additionally formed on the light emitting element 130 or may be attached using an adhesive (not shown). The encapsulation layer or the encapsulation plate may protect the light emitting element 130 and form the surface of the electronic device 1000.

The display panel 100 may further include a touch screen panel (TSP)(not shown). The touch screen panel may be between the light emitting element 130 and the encapsulation layer or the encapsulation plate, or may be on the encapsulation layer or the encapsulation plate. The touch screen panel may generate one or more signals based on the recognition target 40 contacting a particular (or, alternatively, predetermined) sub-pixel (PX) of the display panel 100. Accordingly, a particular (or, alternatively, predetermined) sub-pixel (PX) contacting the recognition target 40 may be determined based on one or more signal processing generated by the touch screen panel.

The display panel 100 may be, for example, a top emission type in which light is emitted toward the upper electrodes 132B, 132G, and 132R.

The biometric sensor 200 is stacked with the display panel 100 and may be, for example, disposed under the display panel 100.

The biometric sensor 200 may be, for example, a sensor configured to recognize a biometric image such as a fingerprint, a blood vessel shape, an iris, or a face, or a sensor configured to recognize a biometric signal such as a change in blood flow of a blood vessel. The biometric sensor 200 may be, for example, an optical type sensor. The biometric sensor 200 may be, for example, a fingerprint recognition sensor, and may be, for example, an optical type fingerprint recognition sensor.

The biometric sensor 200 may be configured to detect light that is emitted from the display panel 100 and then reflected by a recognition target 40 such as a living body (e.g., a finger) or a tool. In more detail, light emitted from the light emitting element 130 of the display panel 100 may be reflected by a living body or a tool, and the reflected light may be detected by the biometric sensor 200.

The biometric sensor 200 may be, for example, a complementary metal oxide semiconductor (CMOS) sensor.

The biometric sensor 200 includes a substrate 210 and a photoelectric conversion region 215 on the substrate 210, where the photoelectric conversion region 215 may include one or multiple photoelectric conversion elements 220 that each include at least one photoelectric conversion layer 223 having wavelength selectivity. As shown in FIG. 4, the biometric sensor 200 may further include an encapsulation layer 230 on the substrate 210 and photoelectric conversion region 215, although in some example embodiments the encapsulation layer 230 may be considered to be separate from (e.g., external to) the biometric sensor 200. The substrate 210 may be a silicon substrate. The photoelectric conversion region 215 may be interchangeably referred to herein as a photoelectric conversion element. As described herein, the photoelectric conversion region 215 may be a photoelectric conversion element that includes a photoelectric conversion layer having wavelength selectivity (e.g., a photoelectric conversion layer that is configured to selectively absorb incident light of a particular wavelength spectrum). In some example embodiments, a thickness 200*t* of the biometric sensor 200 (which may be a combined thickness of the substrate 210 and the photoelectric conversion region 215 and/or a photoelectric conversion element 220 thereof) is less than or equal to about 0.5 mm, for example between about 50 nm and about 0.5 mm.

As shown in FIG. 4, the photoelectric conversion elements 220 may each be at least partially between at least two light emitting elements 130 in a horizontal direction (e.g., X and/or Y direction) such that the photoelectric conversion elements 220 may each at least partially overlap a non-display area 800 of the display panel 100 in the vertical direction (e.g., Z direction).

Restated, at least one photoelectric conversion element 220 of the plurality of photoelectric conversion elements 220 of the photoelectric conversion region 215 may at least partially overlap, in the vertical direction (e.g., Z direction) an area that is between at least two adjacent light emitting elements 130 in a horizontal direction (e.g., X direction and/or Y direction), for example at least partially overlap the non-display area 800 in the Z direction.

As shown in FIG. 4, the horizontal direction (e.g., X direction and/or Y direction) may be referred to as being a direction extending parallel to the sub-pixel array (e.g., extending parallel to the sub-pixels (PX)), and the vertical direction (e.g., Z direction) may be referred to as being a direction extending perpendicular to the sub-pixel array (e.g., extending perpendicular to the sub-pixels (PX)). Accordingly, and as shown in at least FIG. 4, it will be understood that the photoelectric conversion elements 220 may each at least partially overlap a non-display area 800 of the display panel 100 in a vertical direction extending perpendicular to the sub-pixel array of sub-pixels (PX) (e.g., Z direction) and the photoelectric conversion elements 220 may each be at least partially between at least two sub-pixels (PX) in a horizontal direction that extends parallel to the sub-pixel array of sub-pixels (PX) (e.g., X and/or Y direction).

Referring to FIG. 4, in some example embodiments the horizontal direction (e.g., X direction and/or Y direction) may be referred to as being a direction extending parallel to the upper surface 210*a* of the substrate 210 of the biometric sensor 200 and the vertical direction (e.g., Z direction) may be referred to as being a direction extending perpendicular to the upper surface 210*a* of the substrate 210. Accordingly, and as shown in at least FIG. 4, it will be understood that the photoelectric conversion elements 220 may each at least partially overlap a non-display area 800 of the display panel 100 in a vertical direction extending perpendicular to the upper surface 210*a* of the substrate 210 and the photoelectric conversion elements 220 may each be at least partially between at least two sub-pixels (PX) in a horizontal direction that extends parallel to the upper surface 210*a* (e.g., X and/or Y direction).

Referring to FIG. 5, the substrate 210 may be a substrate for driving CMOS, for example, a silicon substrate such as a silicon wafer. The substrate 210 includes a charge storage 211 electrically connected to the photoelectric conversion element 220 to be described later, a trench 212 connecting the photoelectric conversion element 220 and the charge storage 211, and a transistor (not shown) such as a transfer transistor. Herein, the transistor in the substrate 210 may be different from the thin film transistor (TFT) in the aforementioned display panel 100, and may exclude the thin film transistor (TFT).

The substrate 210 may not include a photo-sensing device such as a silicon photodiode, such that the substrate 210 does not include any photo-sensing device within a volume 210*v* defined by the outer surfaces 210*s* of the substrate 210. Accordingly, a process of forming the photo-sensing device in the substrate 210 (e.g., within a volume 210*v* defined by the outer surfaces 210*s* of the substrate 210) may be omitted, greatly simplifying the process, and at the same time a noise that may be generated by the process of forming the biometric sensor 200 may be reduced, improving performance of the biometric sensor 200. In addition, it is possible to save a space as much as a thickness and a width occupied by the photo-sensing device in the substrate 210, thereby securing a sufficient space for circuit design, and at the same time significantly reducing the thickness 200*t* of the biometric sensor 200 to implement a slim biometric sensor. For example, in general, in order to form a photo-sensing device in a silicon substrate, a thickness 200t of at least about 3 μm should be secured, whereas a substrate 210 that does not require a photo-sensing device such as Si photodiode may reduce the thickness 210t of the substrate 210 by the thickness of the photo-sensing device (e.g., reduce thickness 210t by at least about 3 μm).

A wire layer 213 is formed on the lower portion or upper portion of the substrate 210. In the drawing, a front side illumination (FSI) structure in which the wire layer 213 is disposed on the substrate 210 is shown, but the present inventive concepts are not limited thereto, and a back side illumination (BSI) structure in which the wire layer 213 is disposed under the substrate 210 may be implemented. The wire layer 213 includes one or two or more interlayer insulating layers 213-1, a plurality of metal wires 213-2 and a plurality of contact holes 213-3. The metal wire 213-2 may include a metal having a low specific resistance such as aluminum (Al), copper (Cu), silver (Ag), and an alloy thereof, but is not limited thereto. A plurality of contact holes 213-3 may be filled with a filler.

One or more substrate 210 may be included, and the substrate 210 may be a stacked CMOS substrate in which a plurality of silicon substrates and a plurality of wire layers are stacked.

A photoelectric conversion region 215 is disposed on the substrate 210. The photoelectric conversion region 215 may be arranged, for example, along an in-plane direction (e.g., XY direction) of the substrate 210, and may be at least partially overlapped in a vertical direction (e.g., Z direction) with the region between the aforementioned adjacent light emitting elements 130 (e.g., with the non-display area 800), for example, may be disposed to be partially overlapped with the aforementioned light emitting elements 130. Each photoelectric conversion region 215 may include a plurality of photoelectric conversion elements 220. A plurality of photoelectric conversion elements 220 may be arranged along rows and/or columns. At least some of the photoelectric conversion elements 220, (e.g., the photoelectric conversion layer 223) may be configured to selectively absorb light of one of at least a portion of the visible wavelength spectrum or at least a portion of the infrared wavelength spectrum.

For example, the photoelectric conversion region 215 may be disposed to be at least partially overlapped with the non-display area 800 of the display panel 100. Accordingly, light emitted from the light emitting element 130 may be reflected by the recognition target 40 to be effectively incident on the photoelectric conversion region 215.

The photoelectric conversion element 220 may be configured to absorb light of a particular (or, alternatively, predetermined) wavelength spectrum to convert it photo-electrically, and an electrical signal may be obtained from charges (holes and electrons) generated by photoelectric conversion. The photoelectric conversion element 220 may include a photoelectric conversion layer 223 that may be configured to selectively absorb at least a portion of either a visible wavelength spectrum or an infrared wavelength spectrum.

The photoelectric conversion element 220 includes a lower electrode 221 (also referred to herein as a first electrode) and an upper electrode 222 (also referred to herein as a second electrode) facing each other, and a photoelectric conversion layer 223 between the lower electrode 221 and the upper electrode 222, and optionally includes an encapsulation layer 230 and a focusing lens 240.

One of the lower electrode 221 or the upper electrode 222 may be an anode and the other may be a cathode. The lower electrode 221 and the upper electrode 222 may be independently a light-transmitting electrode or a reflective electrode, and for example at least one of lower electrode 221 or the upper electrode 222 may be a light-transmitting electrode. For example, the upper electrode 222 may be light-transmitting electrode. The light-transmitting electrode may include at least one of an oxide conductor, a carbon conductor, or a metal thin film. The oxide conductor may be one or more selected from for example ITO, IZO, ZTO, ATO, and AZO, the carbon conductor may be one or more selected from graphene and carbon nanostructure, and the metal thin film may be a very thin film including Al, Mg, Ag, Au, an alloy thereof or any combination thereof. The reflective electrode may include a reflective conductor such as for example Al, Ag, Au, or an alloy thereof.

The photoelectric conversion layer 223 may have wavelength selectivity for selectively absorbing light in a particular (or, alternatively, predetermined) wavelength spectrum, and for example, may be configured to selectively absorb light in a visible wavelength spectrum.

For example, the photoelectric conversion layer 223 may be configured to absorb light of at least a portion of a wavelength spectrum of the visible wavelength spectrum and may not be configured to absorb light of the infrared wavelength spectrum. For example, the display panel 100 (e.g., one or more of the light emitting elements 130) may be configured to emit light of the visible wavelength spectrum, and the photoelectric conversion layer 223 may be configured to absorb light of at least a portion of the visible wavelength spectrum and may be not configured to absorb light of the infrared wavelength spectrum. Herein, the visible wavelength spectrum and/or the portion thereof that the photoelectric conversion layer 223 is configured to absorb may be, for example, a full wavelength spectrum of greater than or equal to about 380 nm and less than about 750 nm, about 400 nm to about 700 nm, or about 420 nm to about 700 nm, and the infrared wavelength spectrum and/or the portion thereof that the photoelectric conversion layer 223 is not configured to selectively absorb may be a full wavelengths spectrum of greater than or equal to about 750 nm, about 750 nm to about 20 μm, about 780 nm to about 20 μm, about 800 nm to about 20 μm, about 750 nm to about 15 μm, about 780 nm to about 15 μm, about 800 nm to about 15 μm, about 750 nm to about 10 μm, about 780 nm to about 10 μm, about 800 nm to about 10 μm, about 750 nm to about 5 μm, about 780 nm to nm to 5 μm, about 800 nm to about 5 μm, about 750 nm to about 3 μm, about 780 nm to about 3 μm, about 800 nm to about 3 μm, about 750 nm to about 2 μm, about 780 nm to about 2 μm, about 800 nm to about 2 μm, about 750 nm to about 1.5 μm, about 780 nm to about 1.5 μm, or about 800 nm to about 1.5 μm. For example, the photoelectric conversion layer 223 may be configured to absorb light of a full wavelength spectrum of greater than or equal to about 380 nm and less than about 750 nm, about 400 nm to about 700 nm or about 420 nm to about 700 nm and may have, for example, an absorbance of greater than or equal to about 0.1, greater than or equal to about 0.2, greater than or equal to about 0.3, greater than or equal to about 0.4, or greater than or equal to about 0.5 in each of greater than or equal to about 400 nm and less than about 500 nm, about 500 nm to about 600 nm, and greater than about 600 nm and less than or equal to about 700 nm. For example, the photoelectric conversion layer 223 may not be configured to absorb light in a wavelength spectrum of greater than or equal to about 750 nm, about 750 nm to about 20 µm, about 780 nm to about 20 µm, about 800 nm to about 20 µm, about 750 nm to about 15 µm, about 780 nm to about 15 µm, about 800 nm to about 15 µm, about 750 nm to about 10 µm, about 780 nm to about 10 µm, about 800 nm to about 10 µm, about 750 nm to about 5 µm, about 780 nm to about 5 µm, about 800 nm to about 5 µm, about 750 nm to about 3 µm, about 780 nm to about 3 µm, about 800 nm to about 3 µm, about 750 nm to about 2 µm, about 780 nm to about 2 µm, about 800 nm to about 2 µm, about 750 nm to about 1.5 µm, about 780 nm to about 1.5 µm, or about 800 nm to about 1.5 µm. The photoelectric conversion layer 223 may be configured to selectively absorb light of one of a blue wavelength spectrum, a green wavelength spectrum, or a red wavelength spectrum. The photoelectric conversion layer 223 may have, for example, an absorbance of less than about 0.1, less than about 0.05, less than about 0.03, less than about 0.02, less than about 0.01, or about 0 in greater than or equal to about 750 nm, about 750 nm to about 20 µm, about 780 nm to about 20 µm, about 800 nm to about 20 µm, about 750 nm to about 15 µm, about 780 nm to about 15 µm, about 800 nm to about 15 µm, about 750 nm to about 10 µm, about 780 nm to about 10 µm, about 800 nm to about 10 µm, about 750 nm to about 5 µm, about 780 nm to about 5 µm, about 800 nm to about 5 µm, about 750 nm to about 3 µm, about 780 nm to about 3 µm, about 800 nm to about 3 µm, about 750 nm to about 2 µm, about 780 nm to about 2 µm, about 800 nm to about 2 µm, about 750 nm to about 1.5 µm, about 780 nm to about 1.5 µm, or about 800 nm to about 1.5 µm.

For example, the aforementioned display panel 100 may be configured to emit light of a visible wavelength spectrum including blue light, green light, and red light. The photoelectric conversion layer 223 may be configured to absorb light of at least a portion of a wavelength spectrum of a visible wavelength spectrum, which is light in the visible wavelength spectrum emitted from the display panel 100 and then reflected by the recognition target 40 and photoelectrically convert the light.

For example, the photoelectric conversion layer 223 may include a p-type semiconductor and an n-type semiconductor forming a pn junction. The p-type semiconductor and the n-type semiconductor receive light from the outside to generate excitons and the generated excitons may be separated into holes and electrons. Each of the p-type semiconductor and the n-type semiconductor may be one or two or more, and each may be a light absorbing material configured to absorb light of at least a portion of a wavelength spectrum of the visible wavelength spectrum. For example, the p-type semiconductor and/or the n-type semiconductor may be a light absorbing material configured to absorb light in the full visible wavelength spectrum. For example, the p-type semiconductor and/or the n-type semiconductor may be a light absorbing material configured to selectively absorb one or both of blue light, green light, and red light, and a plurality of materials configured to absorb light of different wavelength spectrums may be combined to absorb light in the full visible wavelength spectrum. At least one of the p-type semiconductor or the n-type semiconductor may be an organic light absorbing material.

In some example embodiments, the p-type semiconductor, and thus the photoelectric conversion layer 223, may include a compound represented by Chemical Formula A-1.

[Chemical Formula A-1]

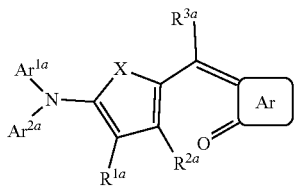

In Chemical Formula A-1,

X may be O, S, Se, Te, SO, $SO_2$, or $SiR^aR^b$,

Ar may be a substituted or unsubstituted C6 to C30 arylene group, a substituted or unsubstituted C3 to C30 heterocyclic group, or a fused ring of the foregoing two or more (e.g., a first fused ring of two or more thereof), $Ar^{1a}$ and/or $Ar^{2a}$ may be independently a substituted or unsubstituted C6 to C30 aryl group or a substituted or unsubstituted C3 to C30 heteroaryl group, $Ar^{1a}$ and $Ar^{2a}$ may be independently present or be linked to each other to form a fused ring (e.g., a second fused ring), and $R^{1a}$ to $R^{3a}$, $R^a$ and $R^b$ may independently be hydrogen, deuterium, a substituted or unsubstituted C1 to C30 alkyl group, a substituted or unsubstituted C1 to C30 alkoxy group, a substituted or unsubstituted C6 to C30 aryl group, a substituted or unsubstituted C3 to C30 heteroaryl group, a halogen, a cyano group, or a combination thereof.

In some example embodiments, the n-type semiconductor, and thus the photoelectric conversion layer 223, may include one or more of an organic metal complex such as tris(8-hydroxyquinolinato)aluminum $Alq_3$, subphthalocyanine SubPc, or phthalocyanine Pc, or a derivative thereof, carboxylic anhydrides such as 1,4,5,8-naphthalenetetracarboxylic dianhydride NTCDA or a derivative thereof, perylene diimide such as N,N'-bis(2,6-dimethylphenyl) perylene-3,4,9,10-tetracarboxylic diimide, or a derivative thereof, thiophene or a thiophene derivative, fullerene such as C60, C70, C78, or C80, a fullerene derivative, or a combination thereof. Examples of fullerenes may include C50 fullerene, C60 fullerene, C70 fullerene, C76 fullerene, C78 fullerene, C80 fullerene, C82 fullerene, C84 fullerene, C90 fullerene, C96 fullerene, C240 fullerene, C540 fullerene, and the like, but are not limited thereto.

The photoelectric conversion layer 223 may include and/or may be an intrinsic layer (I layer) in which a p-type semiconductor and an n-type semiconductor are blended in a form of bulk heterojunction. Herein, the p-type semiconductor and the n-type semiconductor may be mixed in a volume ratio (thickness ratio) of about 1:9 to about 9:1, within the range, for example a volume ratio (thickness ratio) of about 2:8 to about 8:2, about 3:7 to about 7:3, about 4:6 to about 6:4, or about 5:5.

The photoelectric conversion layer 223 may include a double layer including a p-type layer including a p-type semiconductor and an n-type layer including an n-type semiconductor. Herein, a thickness ratio of the p-type layer and the n-type layer may be about 1:9 to about 9:1, and within the range, for example, about 2:8 to about 8:2, about 3:7 to about 7:3, about 4:6 to about 6:4, or about 5:5.

The photoelectric conversion layer 223 may further include a p-type layer and/or an n-type layer in addition to the intrinsic layer (I layer). The p-type layer may include a p-type semiconductor, and the n-type layer may include an n-type semiconductor. For example, they may be included in various combinations such as a p-type layer/I layer, an I-layer/n-type layer, and a p-type layer/I-layer/n-type layer.

For example, when light reflected from the recognition target 40 is incident through the upper electrode 222 and light in the visible wavelength spectrum is absorbed in the photoelectric conversion layer 223, excitons may be generated thereinside. The excitons are separated into holes and electrons in the photoelectric conversion layer 223, and the separated holes move toward an anode, which is one of the lower electrode 221 or the upper electrode 222, and the separated electrons move toward a cathode which is the other of the lower electrode 221 and the upper electrode 222, so as to flow a current. The separated electrons and/or holes may be collected in the charge storage 211.

For example, the photoelectric conversion layer 223 may include a p-type semiconductor or an n-type semiconductor, and the p-type semiconductor or n-type semiconductor may form a Schottky junction with the lower electrode 221 or the upper electrode 222. The Schottky junction may be formed by charge carrier trap sites formed in the photoelectric conversion layer 223. The charge trapping site may be intentionally or unintentionally present in the photoelectric conversion layer 223 due to a conformation of molecules themselves, such as arrangement, alignment, and/or stacking of organic materials.

Since the Schottky junction is formed between the electrode and the p-type semiconductor or the electrode and the n-type semiconductor, unlike the pn junction, the p-type semiconductor and the n-type semiconductor may not be included together. The p-type semiconductor or n-type semiconductor may include one or two or more. For example, the p-type semiconductor or the n-type semiconductor may be a light absorbing material configured to absorb light in the full visible wavelength spectrum. For example, the p-type semiconductor or the n-type semiconductor may be a light absorbing material configured to selectively absorb one or both of blue light, green light, and red light, and a plurality of materials absorbing light of different wavelength spectrums may be combined to absorb light throughout the full visible light wavelength spectrum. The p-type semiconductor or n-type semiconductor may be an organic light absorbing material.

For example, when light reflected by the recognition target 40 enters the photoelectric conversion layer 223, photo-generated charges may be generated by the absorption of the p-type semiconductor or the n-type semiconductor and trapped in the charge trap sites of the photoelectric conversion layer 223 and then lead interfacial band bending of Schottky junctions between the lower electrode 221 and the photoelectric conversion layer 223 or the upper electrode 222 and the photoelectric conversion layer 223 and thus lower or remove an energy barrier between the lower electrode 221 and the photoelectric conversion layer 223 or the upper electrode 222 and the photoelectric conversion layer 223. Accordingly, the charges may be effectively injected from the lower electrode 221 or the upper electrode 222 into the photoelectric conversion layer 223 by an external voltage applied between the lower electrode 221 or the upper electrode 222 like a reverse bias. In other words, the photo-generated charges generated by the recognition target 40 in the photoelectric conversion layer 223 may play a role of switching such as leading the interfacial band bending of Schottky junctions, so that the charges may be effectively injected from the lower electrode 221 or the upper electrode 222 into the photoelectric conversion layer 223 by applying the external voltage thereto, and the injected charges may be transferred to the upper electrode 222 or the lower electrode 221 and read as electrical signals of the biometric sensor 200. Herein, an amount of the charges (a current amount) may be adjusted depending on strength of the applied voltage, wherein since a stronger voltage may increase the current amount, unlike pn junctions, a weak reflected light may obtain a sufficient current amount by adjusting an external bias, and thus the biometric sensor 200 may be effectively implemented.

The photoelectric conversion layer 223 may be formed on a whole surface of the photoelectric conversion region 215. Accordingly, high absorption efficiency may be provided by selectively absorbing light in the visible wavelength spectrum and increasing the light absorption area.

The photoelectric conversion layer 223 may have a thickness 223t of about 5 nm to about 1000 nm, for example, about 5 nm to about 800 nm or about 5 nm to about 500 nm. Within the above thickness range, it is possible to effectively absorb light and effectively separate and transmit holes and electrons, thereby effectively improving photoelectric conversion efficiency.

The photoelectric conversion element 220 may further include a buffer layer 225 between the lower electrode 221 and the photoelectric conversion layer 223 and/or between the upper electrode 222 and the photoelectric conversion layer 223. Each of the buffer layers may independently be a hole transport layer, a hole injection layer, a hole extraction layer, an electron blocking layer, an electron transport layer, an electron injection layer, an electron extraction layer, a hole blocking layer, an optical auxiliary layer, or any combination thereof. The buffer layer may effectively transfer or extract charges (holes and electrons) separated from the photoelectric conversion layer 223 to the lower electrode 221 and the upper electrode 222, respectively, and at the same time, when voltage is applied from the outside, reverse injection or transfer of charges from the lower electrode 221 to the photoelectric conversion layer 223 or reverse injection or transfer of charges from the upper electrode 222 to the photoelectric conversion layer 223 may be blocked. Accordingly, it is possible to improve efficiency and sensitivity of the photoelectric conversion element 220 by increasing the photoelectric conversion efficiency of the photoelectric conversion element 220 and effectively reducing dark current and remaining charge carriers. For example, at least one of the buffer layers may be an organic buffer layer. For example, at least one of the buffer layers may be an inorganic buffer layer, and may include, for example, a lanthanide element such as ytterbium (Yb), calcium (Ca), potassium (K), aluminum (Al), or an alloy thereof.

The photoelectric conversion element 220 may further include an anti-reflection layer (not shown) on the upper electrode 222. The anti-reflection layer may be disposed at the side to which the light is incident to lower reflectivity of the incident light, thereby further improving light absorption. The anti-reflection layer may include, for example, a material having a refractive index of about 1.6 to about 2.5, and may include, for example, at least one of a metal oxide, a metal sulfide, or an organic material having a refractive index within the above range. The anti-reflection layer may include, for example, a metal oxide such as an aluminum-containing oxide, a molybdenum-containing oxide, a tungsten-containing oxide, a vanadium-containing oxide, a rhenium-containing oxide, a niobium-containing oxide, a tantalum-containing oxide, a titanium-containing oxide, a nickel-containing oxide, a copper-containing oxide, a cobalt-containing oxide, a manganese-containing oxide, a chromium-containing oxide, a tellerium-containing oxide, or any combination thereof; a metal sulfide such as zinc sulfide; or an organic material such as an amine derivative, but is not limited thereto.

The encapsulation layer 230 may be disposed on the photoelectric conversion element 220 and may cover the whole surface of the photoelectric conversion element 220. The encapsulation layer 230 may include a glass substrate, a polymer substrate, a metal thin film, and/or an insulating thin film, but is not limited thereto.

The focusing lens 240 may be disposed on the encapsulation layer 230 and may collect the reflected light into one point by controlling a direction of light reflected from the recognition target 40. The focusing lens 240 may be, for example, a cylinder shape or a hemispherical shape, but is not limited thereto.

A lower surface of the display panel 100 and the upper surface of the biometric sensor 200 may be in direct contact or may be attached by, for example, an adhesive or a fixing member 330.

A battery 300 is disposed under the biometric sensor 200. As described above, the biometric sensor 200 may not include a separate photo-sensing device such as a Si photodiode in the substrate 210, and accordingly, the thickness 200t of the biometric sensor 200 is significantly reduced to provide a slim biometric sensor. Therefore, a battery 300 having a relatively sufficient thickness may be secured, so that a high-capacity battery may be employed.

The electronic device 1000 according to some example embodiments includes the display panel 100 and the biometric sensor 200 which are stacked and uses light emitted from the display panel 100 as a light source and thus may realize the optical biometric sensor 200 without a separate light source. Accordingly, a volume of the electronic device 1000 may be reduced, and a decrease in the aperture ratio of the display panel 100 by an area where the separate light source takes may be prevented, and simultaneously, the power consumption due to the separate light source may be saved to improve power consumption of the electronic device 1000.

In addition, the electronic device 1000 according to some example embodiments includes the display panel 100 emitting light of a visible wavelength spectrum and the biometric sensor 200 sensing the reflected light of the light of a visible wavelength spectrum, and thus effectively increase a dose of incident light on the biometric sensor 200 and improve sensitivity and accordingly, secure improved biometric accuracy of the electronic device 1000.

Furthermore, the electronic device 1000 according to some example embodiments of the present inventive concepts may be manufactured by separately manufacturing the display panel 100 and the biometric sensor 200 and then bonding or adhering them and thus, simplifying a manufacture process.

In addition, in the electronic device 1000 according to some example embodiments, the biometric sensor 200 includes the photoelectric conversion element 220 having wavelength selectivity, as described above, and thus may not include a separate infrared cut-filter (IR cut-filter) for blocking an infrared wavelength spectrum (e.g., may not include any separate infrared cut-filter that is separate from the photoelectric conversion element 220). As a result, the electronic device 1000 may not include any infrared cut-filters. If the biometric sensor 200 includes a photo-sensing device such as a Si photodiode, the infrared cut-filter may be necessarily required due to a broad absorption wavelength spectrum (a visible light spectrum to an infrared spectrum) of the Si photodiode, and since noises greatly increase without the infrared cut-filter, the biometric sensor 200 may not perform a desired biometric recognition function. However, the electronic device 1000 according to some example embodiments may be configured to selectively absorb light of a visible wavelength spectrum in the biometric sensor 200 and thus fundamentally block generation of the noises by the infrared light without the infrared cut-filter and thereby, realize a cost-saving and thin electronic device.

In addition, in the electronic device 1000 according to some example embodiments, the biometric sensor 200, as described above, includes the photoelectric conversion element 220 instead of a photo-sensing device such as the Si photodiode and thus omits a process of forming the photo-sensing device to greatly simplify a process and simultaneously, reduce the noises generated by the process of forming the photo-sensing device and thus improve performance of the biometric sensor 200. Accordingly, the substrate 210 may not include any photo-sensing devices within the volume 210v defined by the outer surfaces 210s of the substrate 210 (which includes the upper surface 210a). In addition, since a space may be saved as much as the thickness and width of the photo-sensing device inside the substrate 210, a space for a circuit design may be secured, and simultaneously, the thickness 200t of the biometric sensor 200 may be greatly reduced, realizing a slim biometric sensor and thin electronic device. For example, the photoelectric conversion element 220 may have a thickness 220t of less than or equal to about 1 μm, less than or equal to about 0.8 μm, less than or equal to about 0.7 μm, less than or equal to about 0.5 μm, less than or equal to about 0.4 μm, about 50 nm to about 1 μm, about 50 nm to about 0.8 μm, about 50 nm to about 0.7 μm, about 50 nm to about 0.5 μm, or about 50 nm to about 0.4 μm. Accordingly, the thickness 200t of the biometric sensor 200 may be less than or equal to about 0.5 mm, within the above range, less than or equal to about 0.4 mm, less than or equal to about 0.3 mm, or less than or equal to about 0.2 mm.

In addition, in the electronic device 1000 of some example embodiments, the photoelectric conversion element 220 including the photoelectric conversion layer 223 has more than twice higher light absorption than the silicon photodiode and thus may realize a biometric sensor 200 having the same efficiency with a much thinner thickness. Accordingly, a slim high-performance biometric sensor 200 may be implemented.

In the electronic device 1000 of some example embodiments, a method of recognizing the recognition target 40 may include, for example, detecting light reflected by the recognition target 40 out of light emitted in the light emitting element 130 by operating the light emitting element 130 of the display panel 100 and the biometric sensor 200, comparing an image detected by the biometric sensor 200 with a stored image of the recognition target 40, judging consistency of the compared images, and when consistent, displaying the image by turning off the biometric sensor 200 according to determination that recognition of the recognition target 40 is complete and allowing a user to access to the electronic device 1000.

An electronic device according to some example embodiments is described with reference to FIG. 6 along with FIGS. 1 to 4.

Figure 6:
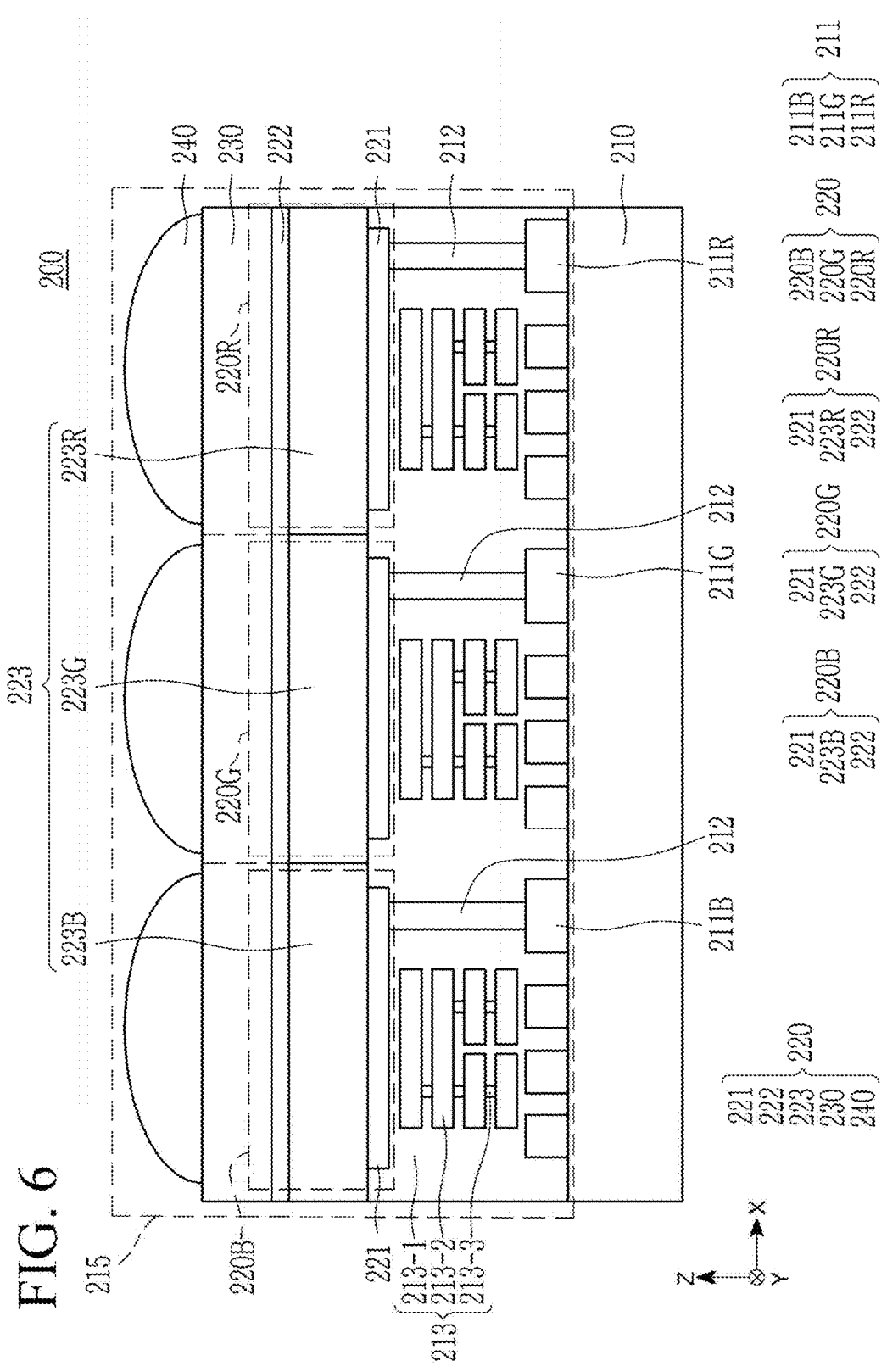
FIG. 6 is a cross-sectional view showing a photoelectric conversion element in the electronic device of FIG. 4, according to some example embodiments.

FIG. 6 is a cross-sectional view showing another example of a photoelectric conversion element in the electronic device of FIG. 4.

The electronic device 1000 according to some example embodiments, like some example embodiments, including the example embodiments shown in FIG. 5, includes the display panel 100 and the biometric sensor 200 which are stacked, wherein the display panel 100 includes the substrate 110, the thin film transistor 120, the light emitting element 130, the insulating layer 140, and the pixel defining layer 150 on the substrate 110, and the biometric sensor 200 includes the substrate 210 and the photoelectric conversion region 215 on the substrate 210.

However, referring to FIG. 6, in the electronic device 1000 according to some example embodiments, unlike some example embodiments, including the example embodiments shown in FIG. 5, the photoelectric conversion region 215 includes a blue photoelectric conversion element 220B, a green photoelectric conversion element 220G, and a red photoelectric conversion element 220R configured to selectively absorb light of a part of the visible wavelength spectrum. Each photoelectric conversion region 215 may include at least one blue, green, and red photoelectric conversion element 220B, 220G, and 220R.

The blue photoelectric conversion element 220B may be configured to selectively absorb blue light, the green photoelectric conversion element 220G may be configured to selectively absorb green light, and the red photoelectric conversion element 220R may be configured to selectively absorb red light. Herein, the selective absorption of blue light, green light, or red light means that the absorption spectrum has a maximum absorption wavelength ($\lambda_{max,A}$) of greater than or equal to about 380 nm and less than 500 nm, about 500 nm to about 600 nm, or greater than about 600 nm and less than or equal to about 700 nm, and that the absorption spectrum within the corresponding wavelength regions is greatly higher than absorption spectra of the other wavelength regions, which means that about 70% to about 100%, about 75% to about 100%, about 80% to about 100%, about 85% to about 100%, about 90% to about 100%, or about 95% to about 100% of the total area of the absorption spectrum belong to the corresponding wavelength spectra. Herein, the selectively sensing the blue light, the green light, or the red light means that each external quantum efficiency (EQE) spectrum has a maximum peak wavelength ($\lambda_{max, EQE}$) in a range of greater than or equal to about 380 nm and less than 500 nm, about 500 nm to about 600 nm, or greater than about 600 nm and less than or equal to about 700 nm, wherein the EQE spectrum within its corresponding wavelength region is greatly higher than EQE spectra of the other wavelength regions, which means that about 70% to about 100%, about 75% to about 100%, about 80% to about 100%, about 85% to about 100%, about 90% to about 100%, or about 95% to about 100% of the total area of the EQE spectrum, for example, belongs to the corresponding wavelength region.

The blue photoelectric conversion element 220B includes a lower electrode 221, an upper electrode 222, and a blue photoelectric conversion layer 223B configured to selectively absorb blue light. The blue photoelectric conversion layer 223B includes a p-type semiconductor and an n-type semiconductor capable of forming a pn junction, or a p-type semiconductor or an n-type semiconductor capable of forming a Schottky junction with the lower electrode 221 or the upper electrode 222. At least one of the p-type semiconductor and/or the n-type semiconductor may include a light absorbing material configured to selectively absorb blue light. For example, when light reflected from the recognition target 40 is incident through the upper electrode 222 and light in the visible wavelength spectrum is absorbed in the blue photoelectric conversion layer 223B, excitons may be generated thereinside. The excitons are separated into holes and electrons in the blue photoelectric conversion layer 223B, and the separated holes move toward an anode, which is one of the lower electrode 221 or the upper electrode 222, and the separated electrons move toward a cathode which is the other of the lower electrode 221 and the upper electrode 222, so as to flow a current. The separated electrons and/or holes may be collected in the charge storage 211B.

The green photoelectric conversion element 220G includes a lower electrode 221, an upper electrode 222, and a green photoelectric conversion layer 223G configured to selectively absorb green light. The green photoelectric conversion layer 223G may include a p-type semiconductor and an n-type semiconductor capable of forming a pn junction, or may include a p-type semiconductor or an n-type semiconductor capable of forming a Schottky junction with the lower electrode 221 or the upper electrode 222. At least one of the p-type semiconductor and/or the n-type semiconductor may include a light absorbing material configured to selectively absorb green light. For example, when light reflected from the recognition target 40 is incident through the upper electrode 222 and light in the visible wavelength spectrum is absorbed in the green photoelectric conversion layer 223G, excitons may be generated thereinside. The excitons are separated into holes and electrons in the green photoelectric conversion layer 223G, and the separated holes move toward an anode, which is one of the lower electrode 221 or the upper electrode 222, and the separated electrons move toward a cathode which is the other of the lower electrode 221 and the upper electrode 222, so as to flow a current. The separated electrons and/or holes may be collected in the charge storage 211G.

The red photoelectric conversion element 220R includes a lower electrode 221, an upper electrode 222, and a red photoelectric conversion layer 223R configured to selectively absorb red light. The red photoelectric conversion layer 223R may include a p-type semiconductor and an n-type semiconductor capable of forming a pn junction, or may include a p-type semiconductor or an n-type semiconductor capable of forming a Schottky junction with the lower electrode 221 or the upper electrode 222. At least one of the p-type semiconductor and/or the n-type semiconductor may include a light absorbing material configured to selectively absorb red light. For example, when light reflected from the recognition target 40 is incident through the upper electrode 222 and light in the visible wavelength spectrum is absorbed in the red photoelectric conversion layer 223R, excitons may be generated thereinside. The excitons are separated into holes and electrons in the red photoelectric conversion layer 223R, and the separated holes move toward an anode, which is one of the lower electrode 221 or the upper electrode 222, and the separated electrons move toward a cathode which is the other of the lower electrode 221 and the upper electrode 222, so as to flow a current. The separated electrons and/or holes may be collected in the charge storage 211R.

Accordingly, the photoelectric conversion elements 220B, 220G, 220R may each be understood to include a lower electrode 221, an upper electrode 222, and a photoelectric conversion layer 223B, 223G, or 223R that is configured to selectively absorb light in at least a portion of the visible wavelength spectrum (e.g., blue, green, or red light) and is not configured to absorb light in the infrared wavelength spectrum.

The blue photoelectric conversion element 220B, the green photoelectric conversion element 220G, and the red photoelectric conversion element 220R may be alternately arranged along the in-plane direction (e.g., XY direction) of the substrate 210 in the photoelectric conversion region 215, for example, repetitively arranged along a row and/or a column.

The biometric sensor 200 includes a plurality of photoelectric conversion elements 220B, 220G, and 220R on the substrate 210, the plurality of photoelectric conversion elements 220B, 220G, and 220R having different wavelength selectivity in the visible light wavelength spectrum and thus may not include the separate color filter (e.g., may not include any separate color filter). As a result, the electronic device 1000 may not include any color filters. Accordingly, a light loss, a process increase, and a thickness increase which may occur due to the color filter may be prevented.

The electronic device 1000 according to some example embodiments includes the biometric sensor 200 including a plurality of photoelectric conversion elements 220B, 220G, and 220R having wavelength selectivity in the visible light wavelength spectrum and thus may increase sensitivity of the blue light, the green light, and the red light and improve color separation characteristics without mixing the wavelength spectra. Accordingly, the electronic device 1000 according to some example embodiments may additionally realize an anti-spoofing effect in addition to the aforementioned effects. For example, the electronic device 1000 according to some example embodiments may further increase details of a shape of the recognition target 40 by increasing the color separation characteristics of the reflected light and optionally, recognizing a color (e.g., a skin color) of the reflected light and thus much increasing accuracy of the recognition.

An electronic device according to some example embodiments is described with reference to FIG. 7 along with FIGS. 1 to 4.

Figure 7:
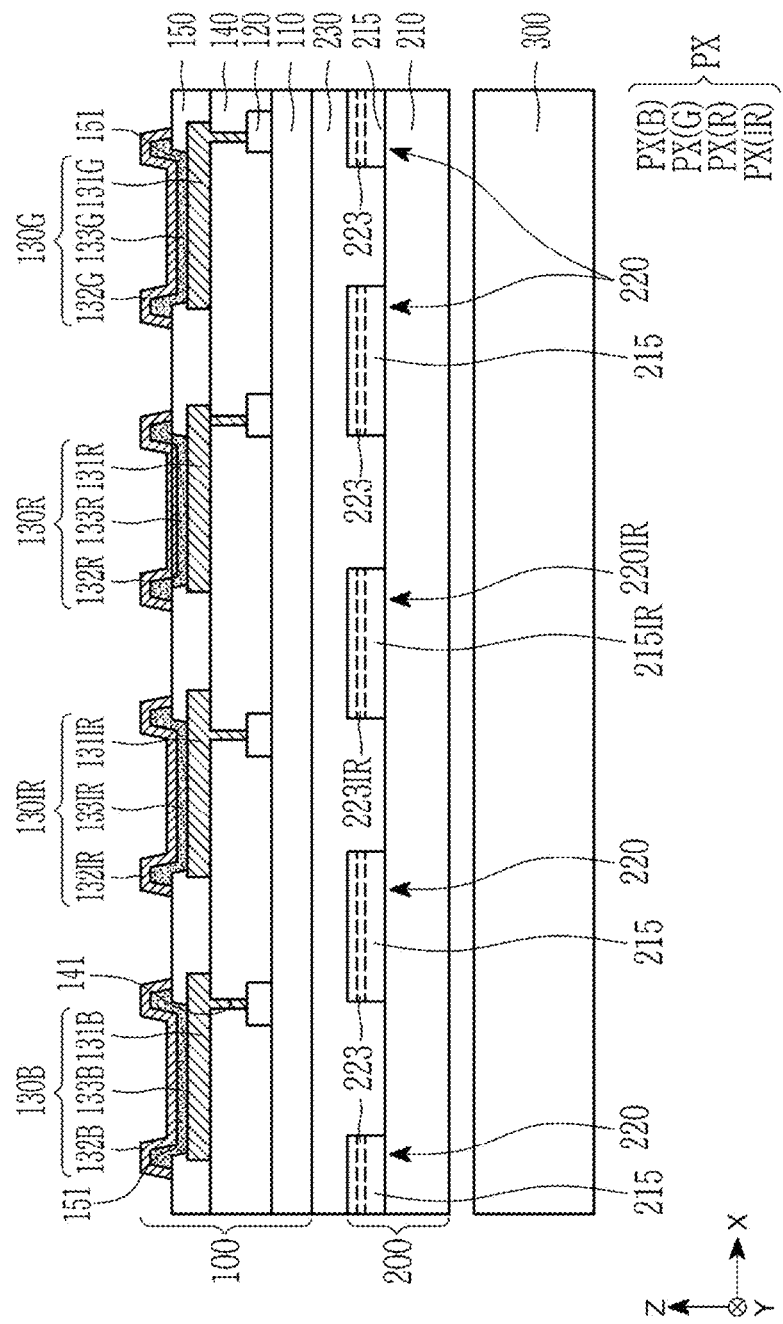
FIG. 7 is a cross-sectional view illustrating the electronic device of FIGS. 1 and 2, according to some example embodiments.
Figure 8:
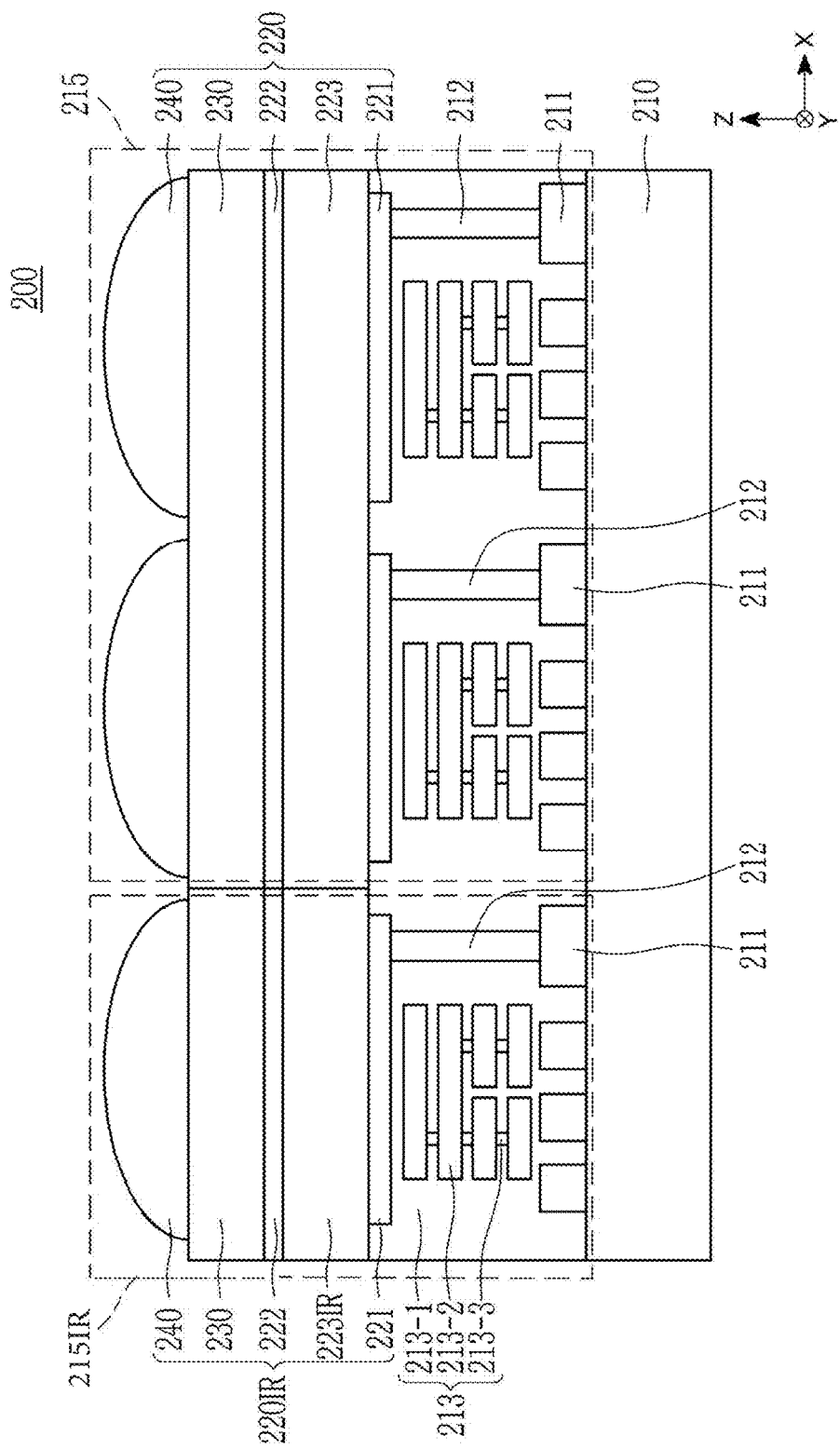
FIG. 8 is a cross-sectional view illustrating a photoelectric conversion element in the electronic device of FIG. 7, according to some example embodiments.
Figure 9:
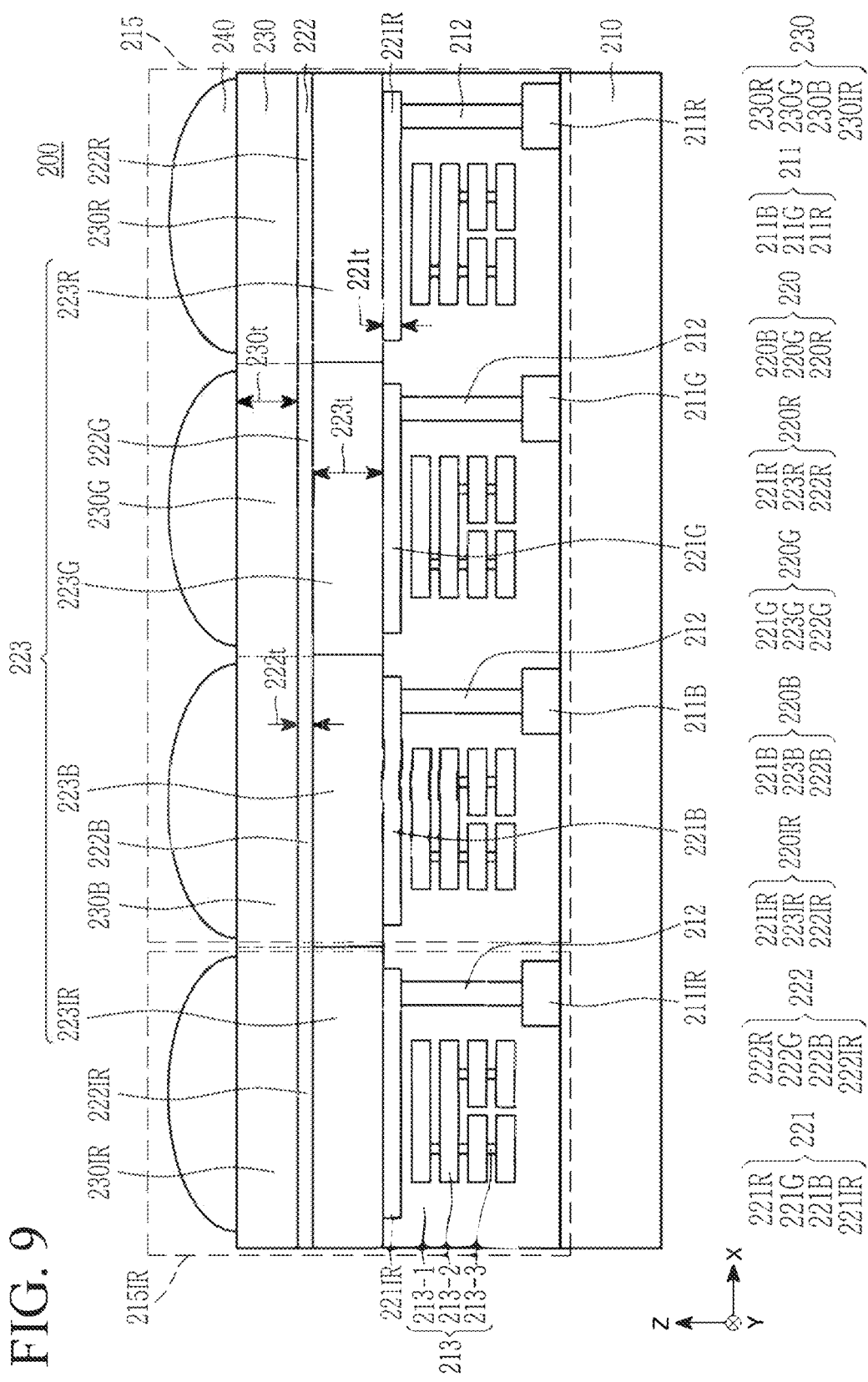
FIG. 9 is a cross-sectional view illustrating a photoelectric conversion element in the electronic device of FIG. 7, according to some example embodiments.

FIG. 7 is a cross-sectional view illustrating another example of the electronic device of FIGS. 1 and 2, FIG. 8 is a cross-sectional view illustrating an example of a photoelectric conversion element in the electronic device of FIG. 7, and FIG. 9 is a cross-sectional view illustrating another example of a photoelectric conversion element in the electronic device of FIG. 7.

Referring to FIG. 7, the electronic device 1000 according to some example embodiments includes a display panel 100, a biometric sensor 200, and optionally a battery 300, which are stacked as in the some example embodiments, including the example embodiments shown in FIG. 4, the display panel 100 includes a substrate 110, a thin film transistor 120 formed on the substrate 110, a plurality of light emitting elements 130, an insulating layer 140, and a pixel defining layer 150, and the biometric sensor 200 includes a substrate 210 and a photoelectric conversion region 215 on the substrate 210.

However, unlike some example embodiments, including the example embodiments shown in FIG. 4, the electronic device 1000 according to some example embodiments further includes an infrared light emitting element 130IR, also referred to herein as an infrared light source, configured to emit light of an infrared wavelength spectrum (hereinafter referred to as "infrared light") in addition to the blue light emitting element 130B, the green light emitting element 130G, and the red light emitting element 130R. The infrared wavelength spectrum may be a longer wavelength spectrum than the aforementioned visible wavelength spectrum, for example greater than or equal to about 750 nm, about 750 nm to about 20 μm, about 780 nm to about 20 μm, about 800 nm to about 20 μm, about 750 nm to about 15 μm, about 780 nm to about 15 μm, about 800 nm to about 15 μm, about 750 nm to about 10 μm, about 780 nm to about 10 μm, about 800 nm to about 10 μm, about 750 nm to about 5 μm, about 780 nm to about 5 μm, about 800 nm to about 5 μm, about 750 nm to about 3 μm, about 780 nm to about 3 μm, about 800 nm to about 3 μm, about 750 nm to about 2 μm, about 780 nm to about 2 μm, about 800 nm to about 2 μm, about 750 nm to about 1.5 μm, about 780 nm to about 1.5 μm, or about 800 nm to about 1.5 μm. The infrared light emitting element 130IR may be in a separate infrared sub-pixel (not shown), or in a blue sub-pixel (PX (B)), a green sub-pixel (PX (G)), and/or a red sub-pixel (PX (R)).

The infrared light emitting element 130IR may include a lower electrode 131IR, an upper electrode 132IR, and an infrared light emitting layer 133IR. The lower electrode 131IR and the upper electrode 132IR may be the same as the aforementioned lower electrodes 131B, 131G, and 131R and upper electrodes 132B, 132G, and 132R. The infrared light emitting layer 133IR may be configured to emit infrared light, for example, include an organic light emitting material configured to emit the infrared light, for example, at least one host material and a fluorescent or phosphorescent dopant.

In addition, referring to FIG. 8 and/or FIG. 9 along with FIG. 7, the electronic device 1000 according to some example embodiments, unlike some other example embodiments, may include an infrared photoelectric conversion region 215IR configured to selectively absorb and sense infrared light in addition to the photoelectric conversion region 215 configured to absorb and sense light of a visible wavelength spectrum in the biometric sensor 200.

The infrared photoelectric conversion region 215IR includes an infrared photoelectric conversion element 220IR, and the infrared photoelectric conversion element 2201R may include an infrared photoelectric conversion layer 223IR configured to selectively absorb and sense the light of at least a portion of an infrared wavelength spectrum instead of the photoelectric conversion layer 223 configured to selectively absorb the light of at least a portion of a visible wavelength spectrum in the photoelectric conversion element 220 shown in FIG. 5 or 6. The infrared photoelectric conversion layer 223IR may be configured to absorb light of at least some wavelength spectrum out of the infrared wavelength spectra, for example, include an organic infrared absorbing material, an inorganic infrared absorbing material, and/or an organic/inorganic infrared absorbing material. Details are the same as described above.

FIGS. 7 and 8 show a configuration that the infrared light emitting element 130IR and the infrared photoelectric conversion region 215IR are additionally included in the electronic device 1000 shown in FIGS. 4 and 5, and FIGS. 7 and 9 show a configuration that the infrared light emitting element 130IR and the infrared photoelectric conversion region 215IR are additionally included in the electronic device 1000 shown in FIGS. 4 and 6.

The electronic device 1000 according to some example embodiments additionally includes the infrared light emitting element 130IR and the infrared photoelectric conversion region 215IR, and accordingly, infrared light emitted from the infrared light emitting element 130IR is reflected by the recognition target 40, and the reflected light may be sensed in the infrared photoelectric conversion region 215IR. Charges generated through photoelectric conversion in the infrared photoelectric conversion region 215IR are collected in a charge storage and go through an image process to obtain a target image of the recognition target 40, and the obtained image is compared with the image of the recognition target 40 stored in advance to perform recognition. Particularly, since the infrared light may have a deeper penetration depth due to the long wavelength characteristics and also, effectively obtain information located at different distances and thus effectively sense images or changes in blood vessels such as veins, iris and/or face, etc. in addition to fingerprints, its application range may be further expanded.

Still referring to FIG. 9, in some example embodiments, the biometric sensor 200 may include multiple photoelectric conversion elements 220IR, 220B, 220G, 220R on the substrate 210 and which include separate respective upper electrodes 222, lower electrodes 221, and photoelectric conversion layers 223. For example, infrared photoelectric conversion element 220IR may include a respective lower electrode 221IR, upper electrode 222IR, and infrared photoelectric conversion layer 223IR and may optionally include a respective encapsulation layer 230IR. For example, blue photoelectric conversion element 220B may include a respective lower electrode 221B, upper electrode 222B, and blue photoelectric conversion layer 223B and may optionally include a respective encapsulation layer 230B. For example, green photoelectric conversion element 220G may include a respective lower electrode 221G, upper electrode 222G, and green photoelectric conversion layer 223G and may optionally include a respective encapsulation layer 230G. For example, red photoelectric conversion element 220R may include a respective lower electrode 221R, upper electrode 222R, and red photoelectric conversion layer 223R and may optionally include a respective encapsulation layer 230R.

In some example embodiments, separate upper electrodes 222, lower electrodes 221, photoelectric conversion layers 223, and/or encapsulation layers 230 of separate photoelectric conversion elements 220 may include separate portions of a single layer that extends continuously between the separate photoelectric conversion elements and/or may include separate layers having different material compositions and/or thicknesses in the vertical direction.

In some example embodiments, at least two adjacent photoelectric conversion elements 220 of the plurality of photoelectric conversion elements 220 may have at least one of respective upper electrodes 222, respective lower electrodes 221, or respective photoelectric conversion layers 223 that are separate portions of a single layer extending continuously between the at least two adjacent photoelectric conversion elements 220. For example, as shown in FIG. 9, the photoelectric conversion elements 220IR, 220B, 220G, 220R have respective upper electrodes 222IR, 222B, 222G, 222R that are separate portions of a single layer of material, defining the upper electrode 222, that extends continuously between the photoelectric conversion elements 220IR, 220B, 220G, 220R and may have respective encapsulation layers 230IR, 230B, 230G, 230R that are separate portions of a single layer of material, defining the encapsulation layer 230, that extends continuously between the photoelectric conversion elements 220IR, 220B, 220G, 220R. However, it will be understood that the example embodiments are not limited thereto. For example, two or more of the separate photoelectric conversion layers 223IR, 223B, 223G, 223R maybe separate portions of a single layer of material extending continuously between the photoelectric conversion elements 220IR, 220B, 220G, 220R.

In some example embodiments, at least two adjacent photoelectric conversion elements 220 of the plurality of photoelectric conversion elements 220 may have at least one of respective upper electrodes 222, respective lower electrodes 221, or respective photoelectric conversion layers 223 that are separate layers, at least partially overlapping in the horizontal direction extending in parallel to the upper surface 210a, that have different material compositions and/or different thicknesses in the vertical direction. For example, as shown in FIG. 9, the photoelectric conversion elements 220IR, 220B, 220G, 220R have respective photoelectric conversion layers 223IR, 223B, 223G, 223R that are separate layers having different material compositions and may have same or different thicknesses 223t. However, it will be understood that example embodiments are not limited thereto. For example, the photoelectric conversion elements 220IR, 220B, 220G, 220R have respective lower electrodes 221IR, 221B, 221G, 221R that are separate layers having different material compositions and may have same or different thicknesses 221t. For example, the photoelectric conversion elements 220IR, 220B, 220G, 220R have respective upper electrodes 222IR, 222B, 222G, 222R that are separate layers having different material compositions and may have same or different thicknesses 222t. For example, the photoelectric conversion elements 220IR, 220B, 220G, 220R have respective encapsulation layers 230IR, 230B, 230G, 230R that are separate layers having different material compositions and may have same or different thicknesses 230t.

Figure 10:
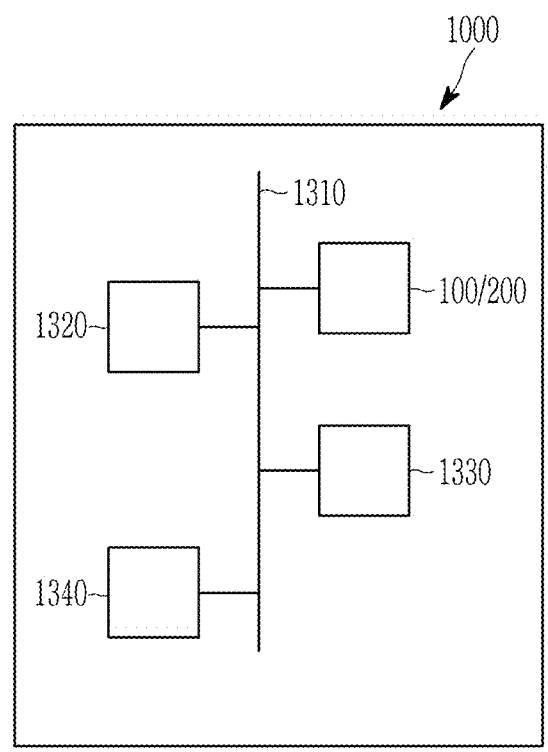
FIG. 10 is a schematic view illustrating an electronic device according to some example embodiments.

FIG. 10 is a schematic view illustrating another example of an electronic device according to some example embodiments.

Referring to FIG. 10, in addition to the aforementioned constituent elements, the electronic device 1000 may further include a bus 1310, a processor 1320, a memory 1330, and at least one additional device 1340. Information of the aforementioned display panel 100, biometric sensor 200, processor 1320, memory 1330, and at least one additional device 1340 may be transmitted to each other through the bus 1310.

The processor 1320 may include one or more processing circuitry such as a hardware including logic circuits; a hardware/software combination such as processor-implemented software; or any combination thereof. For example, the processing circuitry may be a central processing unit (CPU), an arithmetic logic unit (ALU), a digital signal processor, a microcomputer, a field programmable gate array (FPGA), System-on-Chip (SoC), a programmable logic unit, a microprocessor, an application-specific integrated circuit (ASIC), and the like. As an example, the processing circuitry may include a non-transitory computer readable storage device. The processor 1320 may control, for example, a display operation of the display panel 100 or a sensor operation of the biometric sensor 200.

The memory 1330 may store an instruction program, and the processor 1320 may perform a function related to the display panel 100 and the biometric sensor 200 by executing the stored instruction program.

The one or more additional devices 1340 may be one or more communication interfaces (e.g., wireless communication interfaces, wired interfaces), user interfaces (e.g., keyboard, mouse, buttons, etc.), power supply and/or power supply interfaces, or any combination thereof.

The units and/or modules described herein may be implemented using hardware constituent elements and software constituent elements. For example, the hardware constituent elements may include microphones, amplifiers, band pass filters, audio-to-digital converters, and processing devices. The processing device may be implemented using one or more hardware devices configured to perform and/or execute program code by performing arithmetic, logic, and input/output operations. The processing device may include a processor, a controller and an arithmetic logic unit, a digital signal processor, a microcomputer, a field programmable array, a programmable logic unit, a microprocessor, or any other device capable of responding to and executing instructions. The processing device may access, store, operate, process, and generate data in response to execution of an operating system (OS) and one or more software running on the operating system.

The software may include a computer program, a code, an instruction, or any combination thereof, and may transform a processing device for a special purpose by instructing and/or configuring the processing device independently or collectively to operate as desired. The software and data may be implemented permanently or temporarily as signal waves capable of providing or interpreting instructions or data to machines, parts, physical or virtual equipment, computer storage media or devices, or processing devices. The software may also be distributed over networked computer systems so that the software may be stored and executed in a distributed manner. The software and data may be stored by one or more non-transitory computer readable storage devices.

A method according to the foregoing example embodiments may be recorded in a non-transitory computer readable storage device including program instructions for implementing various operations of the aforementioned example embodiments. The storage device may also include program instructions, data files, data structures, and the like alone or in combination. The program instructions recorded in the storage device may be specially designed for some example embodiments or may be known to those skilled in computer software and available for use. Examples of non-transitory computer-readable storage devices may include magnetic media such as hard disks, floppy disks, and magnetic tapes; optical media such as CD-ROM discs, DVDs and/or blue-ray discs; magneto-optical media such as optical disks; and a hardware device configured to store and execute program instructions such as ROM, RAM, flash memory, and the like. The aforementioned device may be configured to operate as one or more software modules to perform the operations of the aforementioned example embodiments.

Hereinafter, some example embodiments are illustrated in more detail with reference to examples. However, the scope of the inventive concepts is not limited to these examples.

Manufacture of Sensor

Example 1

A photoelectric conversion element having a structure of an ITO electrode (150 nm)/an organic photoelectric conversion layer (400 nm)/an ITO electrode (28 nm), and thus a thickness of about 578 nm, is formed to manufacture a sensor (1.8 μm pixel pitch). The organic photoelectric conversion layer includes an organic light absorbing material configured to absorb light in a wavelength region of about 400 nm to about 700 nm.

Reference Example 1

A sensor (pixel pitch: 1.8 μm) having a BSI structure in which about 3 μm-thick photo-diode is integrated inside a silicon substrate (silicon wafer), such that the photo-diode is at least partially located within a volume defined by the outer surfaces of the silicon substrate, is manufactured.

Evaluation I

Efficiency of the sensors according to Example and Reference Example are evaluated in a wavelength region of 400 nm to 1100 nm.

Figure 11:
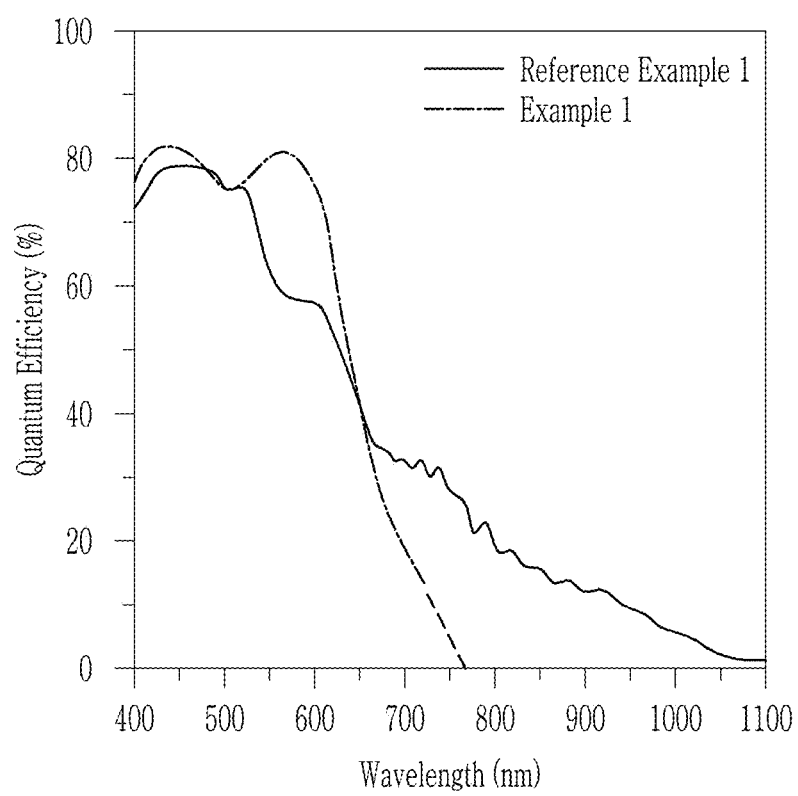
FIG. 11 is a graph showing the efficiency of the sensor according to Example 1 and Reference Example 1, according to some example embodiments.

FIG. 11 is a graph showing the efficiency of the sensor according to Example 1 and Reference Example 1.

Referring to FIG. 11, the sensor according to Example 1 exhibits higher efficiency in a visible light wavelength region of about 400 nm to about 700 nm but lower efficiency in an infrared wavelength region of greater than about 750 nm, compared with the sensor according to Reference Example 1. Accordingly, the sensor according to Example 1 turns out to improve sensitivity about light in the visible light wavelength region and to reduce noises about light in the infrared wavelength region, compared with the sensor according to Reference Example 1.

Evaluation II

The YSNR10 of the sensor according to Example and Reference Example is evaluated.

YSNR10 of the sensor is a minimum light quantity (a unit: lux) where a signal/noise ratio is 10, wherein the signal indicates sensitivity of the signal obtained by color-correcting an RGB raw signal calculated in a FDTD (finite difference time domain) method through a color correction matrix (CCM), and the noise is a noise generated when the signal of the sensor is measured. The color correction is a process of image-processing the RGB raw signal obtained from the sensor and thus reducing a difference from an actual color. The smaller YSNR10 is, the better the sensitivity at a small light quantity are.

The results are shown in Table 1.

TABLE 1

| | YSNR10 (lux) |
|---|---|
| Example 1 | 47.2 |
| Reference Example 1 | 75 |

Referring to Table 1, the sensor according to Example exhibits that YSNR10 becomes lower, compared with the sensor according to Reference Example, which shows that sensitivity of the sensor may be improved.

Optical Simulation I

A sensor including an about 500 nm-thick organic photoelectric conversion layer (Example 2) and a sensor including an about 3 μm-thick silicon photo-diode (Reference Example 2) are designed, and then, output voltages depending on an incident light angle of the sensors (pixel pitch: 3 μm) according to Example and Reference Example are compared.

The output voltages depending on an incident light angle of the sensors may be evaluated in a method of reading photoelectron production of the sensors depending on incident light radiated from a light source into voltage signals.

The results are shown in Table 2.

TABLE 2

| | Output voltage (%) | |
|---|---|---|
| Incident angle | Example 2 | Reference Example 2 |
| 0 degree (vertical incidence) | 100 | 100 |
| ±30 degrees | 83 | 80 |
| ±35 degrees | 79 | 75 |
| ±40 degrees | 72 | 67 |
| ±45 degrees | 65 | 60 |

Referring to Table 2, the sensor according to Example exhibits a small output voltage change depending on an incident angle, compared with the sensor according to Reference Example.

Optical Simulation II

Optical cross-talks of the sensors depending on a thickness are compared.

The optical crosstalks are evaluated in a finite difference time domain (FDTD) method.

Figure 12:
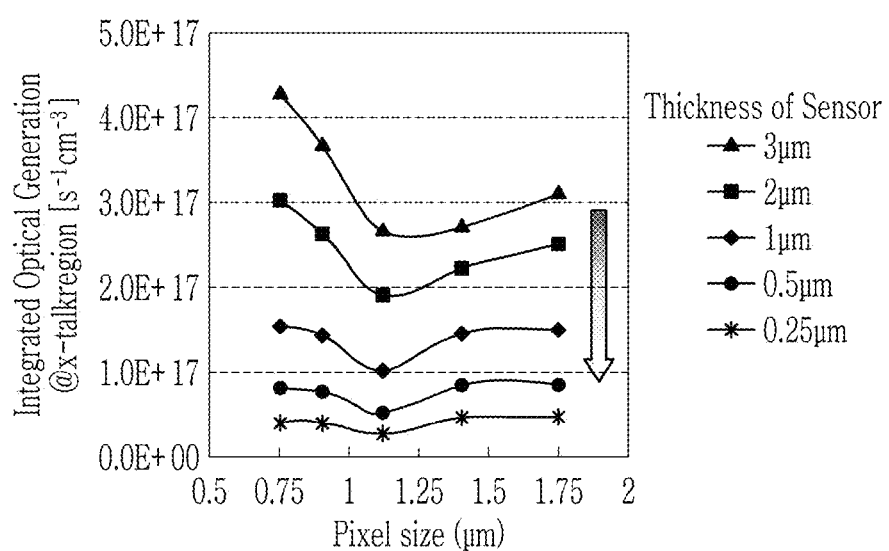
FIG. 12 is a graph showing optical crosstalk according to the thickness of a sensor according to some example embodiments.

The results are shown in FIG. 12.

FIG. 12 is a graph showing optical cross-talks according to the thickness of a sensor.

Referring to FIG. 12, the thinner a sensor is, the smaller the optical crosstalks are. Accordingly, the sensor including a photoelectric conversion element with a thickness of less than or equal to about 1 μm (e.g., about 50 nm to about 0.5 μm and/or about 50 nm to about 1 μm) is expected to exhibit improved optical cross-talks, compared with the sensor including a silicon photodiode with a thickness of greater than or equal to about 3 μm (e.g., a thickness of greater than about 1 μm).

While the inventive concepts have been described in connection with what is presently considered to be practical example embodiments, it is to be understood that the inventive concepts are not limited to such example embodiments, but, on the contrary, is intended to cover various modifications and equivalent arrangements included within the spirit and scope of the appended claims.

What is claimed is:

1. An electronic device, comprising:
a display panel including a light emitter, and
a biometric sensor stacked with the display panel in a vertical direction extending perpendicular to an outer surface of the display panel, the biometric sensor being configured to detect light emitted from the light emitter of the display panel and reflected by a recognition target that is external to the electronic device,
wherein the biometric sensor includes
a silicon substrate including a charge storage, and
a photoelectric conversion element on the silicon substrate and electrically coupled to the charge storage of the silicon substrate, such that the photoelectric conversion element is between the silicon substrate and the light emitter, the photoelectric conversion element including a photoelectric conversion layer having wavelength selectivity configured to absorb light in a visible wavelength spectrum,
wherein the biometric sensor does not comprise any color filter,
wherein the photoelectric conversion element further includes
a lower electrode and an upper electrode facing each other,
a buffer layer that is between the lower electrode and the photoelectric conversion layer or between the upper electrode and the photoelectric conversion layer,
a first encapsulation layer that is on the upper electrode, and
a lens on the first encapsulation layer,
wherein the photoelectric conversion layer is between the lower electrode and the upper electrode,
wherein at least one of the lower electrode or the upper electrode is a light-transmitting electrode, and
wherein the electronic device further includes a second encapsulation layer between the display panel and the lens of the biometric sensor, the second encapsulation layer being on both the lens and the silicon substrate,
wherein the display panel has a lower surface that is coupled to the second encapsulation layer based on at least one of
the lower surface being in direct contact with the second encapsulation layer, or
the lower surface being attached to the second encapsulation layer by an adhesive or a fixing member.

2. The electronic device of claim 1, wherein the biometric sensor is a CMOS sensor.

3. The electronic device of claim 1, wherein
the light emitter of the display panel is configured to emit light of the visible wavelength spectrum, and
the photoelectric conversion layer is configured to selectively absorb light of at least a portion of the visible wavelength spectrum and is not configured to absorb light of an infrared wavelength spectrum.

4. The electronic device of claim 3, wherein the photoelectric conversion layer is configured to selectively absorb light of a full wavelength spectrum of about 400 nm to about 700 nm and is not configured to absorb light of a full wavelength spectrum of about 800 nm to about 20 μm.

5. The electronic device of claim 3, wherein the photoelectric conversion layer is configured to selectively absorb light of one of a blue wavelength spectrum, a green wavelength spectrum, or a red wavelength spectrum.

6. The electronic device of claim 1, wherein the biometric sensor does not comprise any infrared cut-filter.

7. The electronic device of claim 1, wherein
the display panel comprises
a display area comprising the light emitter and configured to display light, and
a non-display area excluding the display area, and
the photoelectric conversion element at least partially overlaps the non-display area in the vertical direction.

8. The electronic device of claim 7, wherein
the display area comprises a sub-pixel array, the sub-pixel array including a plurality of first sub-pixels configured to display light of a blue wavelength spectrum, a plurality of second sub-pixels configured to display light of a green wavelength spectrum, and a plurality of third sub-pixels configured to display light of a red wavelength spectrum, and
the photoelectric conversion element is at least partially between at least two sub-pixels of the sub-pixel array in a horizontal direction extending parallel to the sub-pixel array.

9. The electronic device of claim 1, wherein the light emitter comprises an organic light emitting material, a quantum dot, perovskite, or any combination thereof.

10. The electronic device of claim 1, wherein a thickness of the biometric sensor is between about 50 nm and about 0.5 mm.

11. An electronic device, comprising:
a biometric sensor, the biometric sensor including a plurality of photoelectric conversion elements on a silicon substrate including a charge storage, each photoelectric conversion element of the plurality of photoelectric conversion elements including
a first electrode electrically connected to the charge storage of the silicon substrate,
a photoelectric conversion layer configured to absorb light in a visible wavelength spectrum and not configured to absorb light in an infrared wavelength spectrum, and
a second electrode; and a display panel including a plurality of light emitting elements on a substrate, each light emitting element of the plurality of light emitting elements including
a third electrode,
a light emitting layer including a light emitter, and
a fourth electrode,
wherein the biometric sensor does not comprise any color filter and the plurality of photoelectric conversion elements of the biometric sensor are between the silicon substrate of the biometric sensor and the display panel,
wherein each photoelectric conversion element of the plurality of photoelectric conversion elements further includes
a buffer layer that is between the first electrode and the photoelectric conversion layer or between the second electrode and the photoelectric conversion layer,
a first encapsulation layer that is on the second electrode, and
a lens on the first encapsulation layer,
wherein the photoelectric conversion layer is between the first electrode and the second electrode,
wherein at least one of the first electrode or the second electrode is a light-transmitting electrode, and
wherein the electronic device further includes a second encapsulation layer between the display panel and the lens of each photoelectric conversion element of the plurality of photoelectric conversion elements, the second encapsulation layer being on both the lens of each photoelectric conversion element of the plurality of photoelectric conversion elements and the silicon substrate, wherein the display panel has a lower surface that is coupled to the second encapsulation layer based on at least one of
the lower surface being in direct contact with the second encapsulation layer, or
the lower surface being attached to the second encapsulation layer by an adhesive or a fixing member.

12. The electronic device of claim 11, wherein the biometric sensor is configured to detect light reflected by a recognition target using light emitted from the display panel as a light source, wherein the recognition target is external to the electronic device.

13. The electronic device of claim 12, wherein the display panel is configured to be closer to an exterior of the electronic device than the biometric sensor.

14. The electronic device of claim 11, further comprising a battery,
wherein the biometric sensor is between the display panel and the battery.

15. The electronic device of claim 11, wherein the light emitter is an organic light emitting material, a quantum dot, perovskite, or any combination thereof.

16. The electronic device of claim 11, wherein at least one photoelectric conversion element of the plurality of photoelectric conversion elements at least partially overlaps an area that is horizontally between at least two adjacent light emitting elements of the plurality of light emitting elements, the at least one photoelectric conversion element at least partially overlapping the area in a vertical direction.

17. A biometric sensor for an electronic device, the biometric sensor comprising:
a silicon substrate including a charge storage; and
a photoelectric conversion element on the silicon substrate in a vertical direction and electrically coupled to the charge storage of the silicon substrate, the vertical direction extending perpendicular to an upper surface of the silicon substrate, the photoelectric conversion element including a photoelectric conversion layer configured to selectively absorb at least a portion of a visible wavelength spectrum,
wherein the silicon substrate does not include any photosensing device within a volume defined by outer surfaces of the silicon substrate,
wherein the photoelectric conversion element has a thickness in the vertical direction that is between about 5 nm and about 1 μm,
wherein the biometric sensor does not comprise any color filter,
wherein the photoelectric conversion element further includes
a lower electrode and an upper electrode facing each other,
a buffer layer that is between the lower electrode and the photoelectric conversion layer or between the upper electrode and the photoelectric conversion layer,
a first encapsulation layer that is on the upper electrode, and
a lens on the first encapsulation layer,
wherein the photoelectric conversion layer is between the lower electrode and the upper electrode,
wherein at least one of the lower electrode or the upper electrode is a light-transmitting electrode, and
wherein the biometric sensor further includes a second encapsulation layer on both the lens and the silicon substrate, the second encapsulation layer configured to be coupled to a lower surface of a display panel in the electronic device based on at least one of
the lower surface of the display panel being in direct contact with the second encapsulation layer, or
the lower surface of the display panel being attached to the second encapsulation layer by an adhesive or a fixing member.

18. The biometric sensor of claim 17, wherein the photoelectric conversion layer has a thickness in the vertical direction that is between about 5 nm and about 500 nm.

19. The biometric sensor of claim 17, wherein
the buffer layer is a hole transport layer, a hole injection layer, a hole extraction layer, an electron blocking layer, an electron transport layer, an electron injection layer, an electron extraction layer, a hole blocking layer, an optical auxiliary layer, or any combination thereof.

20. The biometric sensor of claim 17, comprising:
a plurality of photoelectric conversion elements on the silicon substrate in the vertical direction, the plurality of photoelectric conversion elements including the photoelectric conversion element,
wherein the plurality of photoelectric conversion elements each include separate, respective upper electrodes, lower electrodes, and photoelectric conversion layers.

21. The biometric sensor of claim 20, wherein at least two adjacent photoelectric conversion elements of the plurality of photoelectric conversion elements have at least one of respective upper electrodes, respective lower electrodes, or respective photoelectric conversion layers that are separate portions of a single layer extending continuously between the at least two adjacent photoelectric conversion elements.

22. The biometric sensor of claim 20, wherein at least two adjacent photoelectric conversion elements of the plurality of photoelectric conversion elements have at least one of respective upper electrodes, respective lower electrodes, or respective photoelectric conversion layers that are separate layers, at least partially overlapping in a horizontal direction extending in parallel to the upper surface of the silicon substrate, that have different material compositions and/or different thicknesses in the vertical direction.

* * * * *